United States Patent [19]

Sugama et al.

[11] Patent Number: 6,005,158
[45] Date of Patent: Dec. 21, 1999

[54] USE OF SUPER ACIDS TO DIGEST CHRYSOTILE AND AMOSITE ASBESTOS IN SIMPLE MIXTURES OR MATRICES FOUND IN BUILDING MATERIALS COMPOSITIONS

[75] Inventors: Toshifumi Sugama, Wading River; Leon Petrakis, Port Jefferson; Ronald P. Webster, Shoreham, all of N.Y.

[73] Assignee: Brookhaven Science Associates LLC, Upton, N.Y.

[21] Appl. No.: 09/085,091

[22] Filed: May 26, 1998

Related U.S. Application Data

[63] Continuation-in-part of application No. 08/722,803, Sep. 27, 1996, Pat. No. 5,763,738.

[51] Int. Cl.$^6$ .................................. A62D 3/00; B09B 3/00
[52] U.S. Cl. ........................... 588/236; 588/242; 423/659
[58] Field of Search ..................................... 588/236, 242; 423/659

[56] References Cited

U.S. PATENT DOCUMENTS

| | | |
|---|---|---|
| 3,721,637 | 3/1973 | Shultz et al. . |
| 3,821,063 | 6/1974 | D'Olier . |
| 4,818,143 | 4/1989 | Chou . |
| 5,041,277 | 8/1991 | Mirick et al. . |
| 5,258,562 | 11/1993 | Mirick et al. . |
| 5,264,655 | 11/1993 | Mirick et al. . |
| 5,317,056 | 5/1994 | Batdorf . |
| 5,763,738 | 6/1998 | Sugama et al. ..................... 588/236 |

FOREIGN PATENT DOCUMENTS 975 738   12/1980   Russian Federation .

*Primary Examiner*—Tae Yoon
*Attorney, Agent, or Firm*—Margaret C. Bogosian

[57] ABSTRACT

A composition for converting asbestos-containing material to environmentally benign components is provided. The composition comprises a flouro acid decomposing agent which can be applied to either amosite-containing thermal insulation or chrysotile-containing fire-proof material or to any asbestos-containing material which includes of chrysotile and amosite asbestos. The fluoro acid decomposing agent includes $FP(O)(OH)_2$, hexafluorophosphoric acid, a mixture of hydrofluoric and phosphoric acid and a mixture of hexafluorophosphoric acid and phosphoric acid. A method for converting asbestos-containing material to environmentally benign components is also provided.

15 Claims, 14 Drawing Sheets

DECOMPOSITION PATHWAY OF CHRYSOTILE FIBER BY FP(O)(OH)$_2$ SOLUTION.

DECOMPOSITION MODEL OF FP(O)(OH)$_2$ - TREATED AMOSITE FIBER.

ENERGY ΔH, GENERATED BY EXOTHERMIC REACTION BETWEEN
CHRYSOTILE FIBERS AND VARIOUS CHEMICAL REAGENTS.

COMPARISON BETWEEN ENTHALPY VALUES OF EXOTHERMIC ENERGY GENERATED FROM 1.5M FP(O)(OH)$_2$-, HF-, AND H$_3$PO$_4$- TREATED CHRYSOTILE AND AMOSITE.

CHANGES IN ΔH OF 1.5, 2.0, AND 3.0 M FP(O)(OH)$_2$- TREATED AMOSITE SAMPLES AS A FUNCTION OF TIME.

FT-IR SPECTRA FOR THE UNTREATED 1.5M $H_3PO_4$-, 1.5M HF-, 1.5M $FP(O)(OH)_2$-, AND 2.0M $FP(O)(OH)_2$- TREATED CHRYSOTILE FIBERS.

XRD PATTERNS OF CHRYSOTILE (a), 1.5M $H_3PO_4$- (b), 1.5M HF- (c), and 1.5M $FP(O)(OH)_2$- TREATED CHRYSOTILE (d).

FT-IR SPECTRA FOR UNTREATED 1.5M $H_3PO_4$-, 1.5M HF-, 1.5M $FP(O)(OH)_2$-, AND 2.0M $FP(O)(OH)_2$- TREATED AMOSITE FIBERS.

XRD TRACINGS OF UNTREATED (a), 1.5M $H_3PO_4$- (b), 1.5M HF- (c), and 1.5M $FP(O)(OH)_2$- TREATED AMOSITE FIBERS (d).

XPS $Mg_{2p}$ and $Si_{2p}$ CORE-LEVEL SPECTRA FOR UNTREATED, AND 1.5M $H_3PO_4$-, 1.5M HF-, and 1.5M FP(O)(OH)$_2$- TREATED CHRYSOTILE FIBER'S SURFACES.

$P_{2p}$ and $F_{1s}$ REGIONS of $H_3PO_4$-, HF-, and $FP(O)(OH)_2$- TREATED CHRYSOTILE FIBER'S SURFACES.

Mg$_{2p}$, Si$_{2p}$, and P$_{2p}$ REGIONS FOR UNTREATED, AND 1.5M H$_3$PO$_4$-, 1.5M HF-, and 1.5M FP(O)(OH)$_2$- TREATED AMOSITE FIBER'S SURFACES.

$F_{1s}$, $Fe_{2p3/2}$, and $Mn_{2p3/2}$ CORE-LEVEL SPECTRA FOR UNTREATED, AND 1.5M $H_3PO_4$-, 1.5M HF-, and 1.5M $FP(O)(OH)_2$- TREATED AMOSITE SURFACES.

USE OF SUPER ACIDS TO DIGEST CHRYSOTILE AND AMOSITE ASBESTOS IN SIMPLE MIXTURES OR MATRICES FOUND IN BUILDING MATERIALS COMPOSITIONS

This invention is a continuation-in-part application of Ser. No. 08/722,803 filed Sep. 27, 1996 now U.S. Pat. No. 5,763,738 issued Jun. 9, 1998, the contents of which are incorporated herein by reference, as if set forth in full.

This invention was made with Government support under contract number DE-AC02-98CH10886, awarded by the U.S. Department of Energy. The Government has certain rights in the invention.

The present invention relates to compositions and methods for converting chrysotile and amosite asbestos-containing mixtures or matrices found in building materials such as fire-proofing and thermal insulation materials to non-regulated environment benign sounds.

BACKGROUND OF THE INVENTION

Asbestos is a commercial term applied to a group of silicate minerals which occur in fibrous form. There are six principal asbestos minerals. Of these six minerals, only one, chrysotile asbestos, belongs to the group classified as serpentine asbestos, that is, minerals characterized by long fibers that are serpentine in shape. The chemical composition of chrysotile asbestos may be represented as: $Mg_3(Si_2O_5)(OH)_4$ or $3MgO.2SiO_2.H_2O$. The crystalline structure of chrysotile asbestos consists of altering layers of silica and magnesium oxide/hydroxide bound to each other through covalently shared oxygen. These layers are transverse to the fiber axis.

The other varieties of asbestos are silicates of magnesium, iron, calcium, and sodium. These varieties of asbestos belong to the amphibole (straight fiber) group of minerals. About 95% of world production is the chrysotile form of asbestos.

Due to the unique properties of the asbestos minerals, many different kinds of products were developed during the 1940's through the early 1970's that incorporated asbestos fibers for fire resistance, moisture control, and thermal insulation. Many building products, for example, friable thermal insulation, asbestos-cement pipe, asbestos-cement sheet, floor and roof shingles, transite tiles, acoustical plaster, insulation and fire-retardant paper products, and high-temperature insulation, include asbestos fibers. In the overwhelming majority of cases, these products contain the chrysotile form of asbestos.

For a number of years now it has been recognized that many chronic diseases are associated with the inhalation of airborne asbestos fibers. these diseases include lung cancer, chronic fibrosis of the lung lining, and mesothelioma, a rare but fatal cancer of the lungs.

Government agencies have banned the use of certain products containing both chrysotile and amosite asbestos in building construction. There still remains, however, the continuing presence of chrysotile and amosite asbestos-containing materials in many existing buildings as well as the disposition of chrysolite and amosite asbestos-containing materials which were removed from buildings.

Many building owners have chosen to employ additional measures to ensure that asbestos fibers do not enter occupied space. A temporary and inexpensive method is spraying a surface-coating encapsulating material onto chrysotile and/or asbestos-containing materials to lock-in asbestos. This method, however, provides only a temporary remedy.

Another method employed by building owners is to remove completely all chrysotile and/or amosite asbestos-containing materials. However, this method involves a significant amount of time and expense because it requires the buildings to be sealed off, all chrysotile and amosite asbestos-containing materials to be debrided, and all of the debrided chrysotile and/or amosite asbestos-containing materials to be disposed. In addition, many safeguards must be employed to prevent inhalation of airborne asbestos by workers and others in the vicinity of the working area. Furthermore, the disposal of the debrided chrysotile and/or amosite asbestos-containing materials also remains costly.

A number of methods have been proposed for rendering asbestos-containing material less harmful. U.S. Pat. Nos. 5,041,277, 5,258,562 and 5,264,655 to Mirick and Mirick et al. are directed to method and products for converting asbestos to a non-asbestos material. The method of the U.S. Pat. No. 5,041,277 patent requires wetting the asbestos-containing materials with weak organic acids and subsequently rewetting the asbestos-containing materials with additional weak organic acids. This method, although effective, is not efficient in time and cost because it requires successive wetting of asbestos-containing materials.

The methods of the U.S. Pat. Nos. 5,258,562 and 5,264,655 patents require wetting asbestos-containing with an aqueous solution consisting of weak organic acid, such as trifluoroacetic acid, and optionally fluoride ions. Again, although the methods of the Mirick et al. patents may be effective, they are not efficient in cost and time because the disclosed technology requires the conversion process to be repeated as frequently as possible so that the asbestos-containing materials are subjected to successive spraying with acid solution.

It is, therefore, an object of the present invention to provide a composition and method for converting chrysotile and/or amosite asbestos-containing materials to benign materials which overcome the above difficulties generally associated with the prior art.

SUMMARY OF THE INVENTION

The present invention, which addresses the needs of the prior art, provides a composition and method for converting chrysotile and/or amosite asbestos-containing materials to environmentally benign-materials. The composition includes a flouro acid decomposing agent capable of dessociating the asbestos-containing material. The flouro acid may be $FP(O)(OH)_2$, hexafluorophosphoric acid and a mixture of hydrofluoric and phosphoric acid. Whenever phosphoric acid is used, its concentration is preferably from about 1.5 M $FP(O)(OH)_2$ to about 2.0M $FP(O)(OH)_2$. The environmentally benign components which are formed by using the fluoro acid decomposing agents of the present invention includes silicate gel and quartz. The fluoro acid decomposing agent can be applied by spraying the asbestos-containing material or by immersing it into a solution of the decomposing agent.

As a result of the present invention, a composition and method for converting asbestos-containing materials is provided which can convert amosite-containing thermal insulation or chrysotile-containing fire-proof material to environmentally benign materials. The asbestos-containing material may be either chrysotile or amosite containing, or it may be a mixture of both, chrysotile and amosite asbestos.

Other improvements which the present invention provides over the prior art will be identified as a result of the following description which sets forth the preferred embodiments of the present invention. The description is not in any way intended to limit the scope of the present invention, but rather only to provide a working example of the present preferred embodiments. The scope of the present invention will be pointed out in the appended claims.

DETAILED DESCRIPTION OF THE INVENTION

The present invention provides a composition and methods for converting asbestos-containing materials to environmentally benign, non-regulated components.

Non-regulated, environmentally benign components refers to components which are formed after asbestos-containing materials have been morphologically altered to reduce or nullify its hazardous effect on mammals.

Asbestos containing materials include materials including either chrysotile-bearing and/or amosite-bearing materials. For example, fire proofing is a chrysotile bearing material which also includes gypsum and vermiculite. Thermal insulation is an example of amosite fiber bearing material which also includes cement and mineral fillers.

By nature chrysotile asbestos is a serpentine silicate mineral. Each chrysotile asbestos fiber is a long hollow tube. The diameters of the individual tubes are 20 to 50 mm. The length-to-diameter ratio can vary from 20:1 to well over 10,000:1. The chemical composition of chrysotile asbestos can be represented as $Mg_3(Si_2O_5((OH)_4)$.

Figure 1:
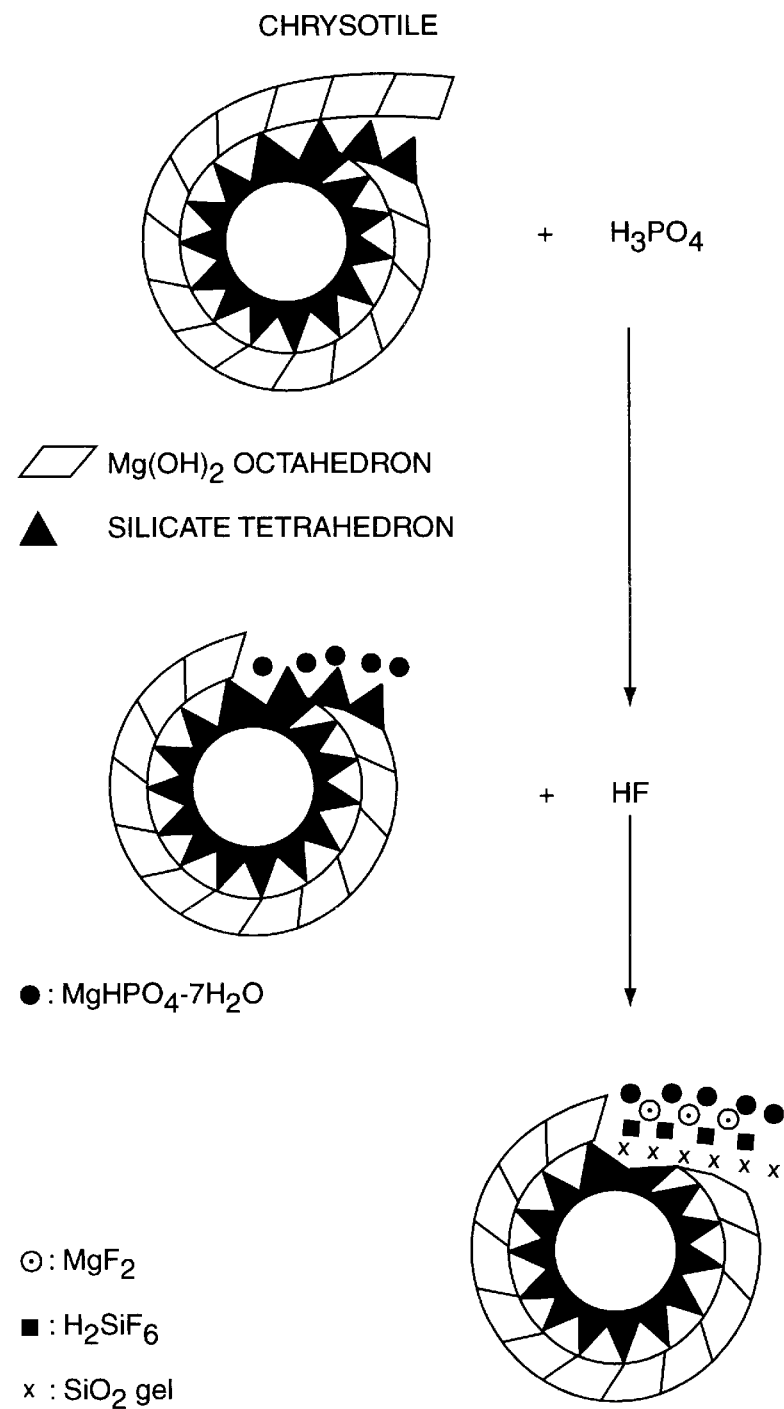
FIG. 1 illustrates a decomposition pathway of chrysotile fiber by $FP(O)(OH)_2$ solution.

The crystalline structure of chrysotile asbestos consists of altering layers of silicate, magnesium oxide, and magnesium hydroxide bound to each other through covalently shared oxygen molecules. These layers are transverse to the fiber axis and appear to form a tubular scroll-like structure. More specifically, chrysotile asbestos can be characterized as a hollow cylindrical tube with the external surface formed by the magnesium hydroxide layer, and with the internal surface formed by the silicate layer as shown in FIG. 1.

When the morphology of chrysotile asbestos is altered by becoming non-regulated or "unrolled" or "uncoiled" the hazardous nature of chrysotile asbestos ceases. Thus, the non-regulated chrysotile asbestos is environmentally benign.

When chrysotile asbestos is exposed to acids, leaching and lixiviating of the magnesium from chrysotile asbestos occur as a result of the interaction between the hydroxyl groups in the magnesium hydroxide layer and the hydrogen ions liberated from the acids. Consequently, the magnesium hydroxide layer is eliminated. The exposure of the chrysotile asbestos to acid results in the conversion of the silicate layer into its various components. More specifically, the acid breaks the Si—OH linkages of the silicate tetrahedron of chrysotile asbestos.

As a result of the above reactions, the tubular scroll-like structure of chrysotile asbestos was converted into an open and unrolled one. Hence, the chrysotile asbestos is converted to a non-regulated environmentally benign component.

Figure 2:
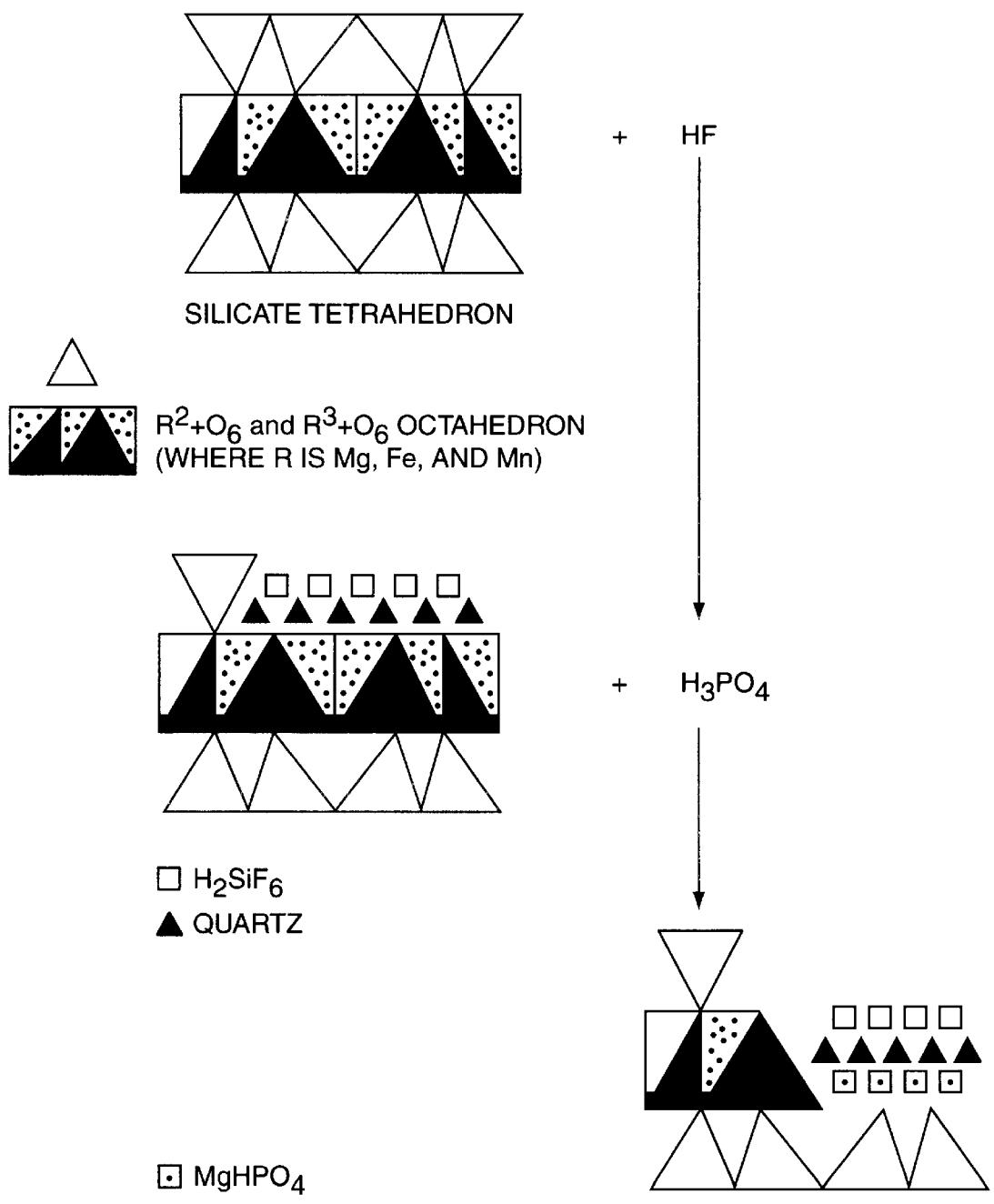
FIG. 2 shows a decomposition model of $FP(O)(OH)_2$-treated amosite fiber.

Other varieties of asbestos are silicates of magnesium, iron, calcium, and sodium. These varieties of asbestos belong to the amphibole (straight fiber) group of minerals. The structure of amosite consists of double-silicate tetrahedral chains which sandwich a layer of edge shared $R^{2+}O_6$ and $R^{3+}O_6$ octahedra, where R is Mg, Fe and Mn. The structure of amosite as well as a mechanism for its decomposition by $FP(O)(OH)_2$ is illustrated in FIG. 2.

Many building products, such as thermal insulation or fire-proofing could incorporate only one type of asbestos, and more frequently mixtures of one or more asbestos minerals. For example, thermal insulation used in power plant pipes could contain amosite from about 35% by weight to about 60% by weight with the reminder consisting of filler material such as gypsum, vermiculite, and/or other inert minerals. A preferred range for asbestos content of fire proofing insulation such as that used for fire doors is from about 2% to about 45% by weight asbestos of which about 30% by weight is amosite, about 15% by weight is chrysotile with the remainder being filler materials. The ranges for asbestos content are quite wide and could vary from 2% to 3% by weight up to 60% to 70% by weight asbestos.

The fluoro acid decomposing agent capable of dissociating the asbestos-containing material is $FP(O)(OH)_2$ as commercially available from Aldrich Co. The present invention contemplates treatment of asbestos-containing materials with a solution of $FP(O)(OH)_2$ which can be from about 1.5 M to about 2.0 M in strength. Preferably, the $FP(O)(OH)_2$ solution is applied by spraying the asbestos containing material or by immersing it into a solution of decomposing agent. Other useful fluoro acid decomposing agents include an aqueous solution of from about 10% by weight to about 30% by weight hexafluorophosphoric acid and a mixture of from about 5% by weight to about 25% by weight HF and from about 10% by weight to about 30% by weight $H_3PO_4$ in aqueous media.

The examples set forth below have been set forth below for the purpose of illustration and to describe the best mode of the invention at the present time. The scope of the invention is not to be in any way limited by the examples set forth below.

EXAMPLES

The following examples have been carried out to convert two different asbestos fibers, chrysotile and amosite into non-regulated materials by using super acids of the present invention and especially $FP(O)(OH)_2$ (FPA). These examples include the rate of exothermic reaction, leaching of ionic species from asbestos, and identification of reaction products and by-products obtained when chrysotile and amosite are decomposed with FPA.

Materials

Two asbestos fibers, chrysotile (Quebec Class 9) and amosite, were obtained from LAB Chrysotile Inc., and the U.S. Department of Commerce National Institute of Standard and Technology, respectively. The fluoroacids used for screening were the fluorosulforic acid ($FSO_3H$), fluorophosphoric acid [$FP(O)(OH)_2$], fluoroboric acid ($HBF_4$), fluorosilicic acid ($H_2SiF_6$), and hydrofluoric acid (HF) as supplied by Aldrich Inc. Mineral acids, such as sulfuric acid ($H_2SO_4$) and phosphoric acid ($H_3PO_4$) were also employed as commercially available. Other useful fluoroacids include hexafluorophosphoric acid ($HPF_6$).

Comparative Example 1

1 gram samples of chrysotile asbestos were each placed in 100 ml of 1.5M fluoroacid selected from $FP(O)(OH)_2$, $FSO_3H$, HF, $H_2SiF_6$, $HBF_4$, $H_3PO_4$ and $H_2SO_4$, respectively. The exothermic reaction generated by the reaction was determined by using a 1455 solution chlorimeter (SC) as provided by Parr Company. The value of exothermic energy of reaction was computed as the enthalpy change, $\Delta H$, (cal./g) after agitating times of 5, 10, 20 and 30 minutes, respectively.

Figure 3:
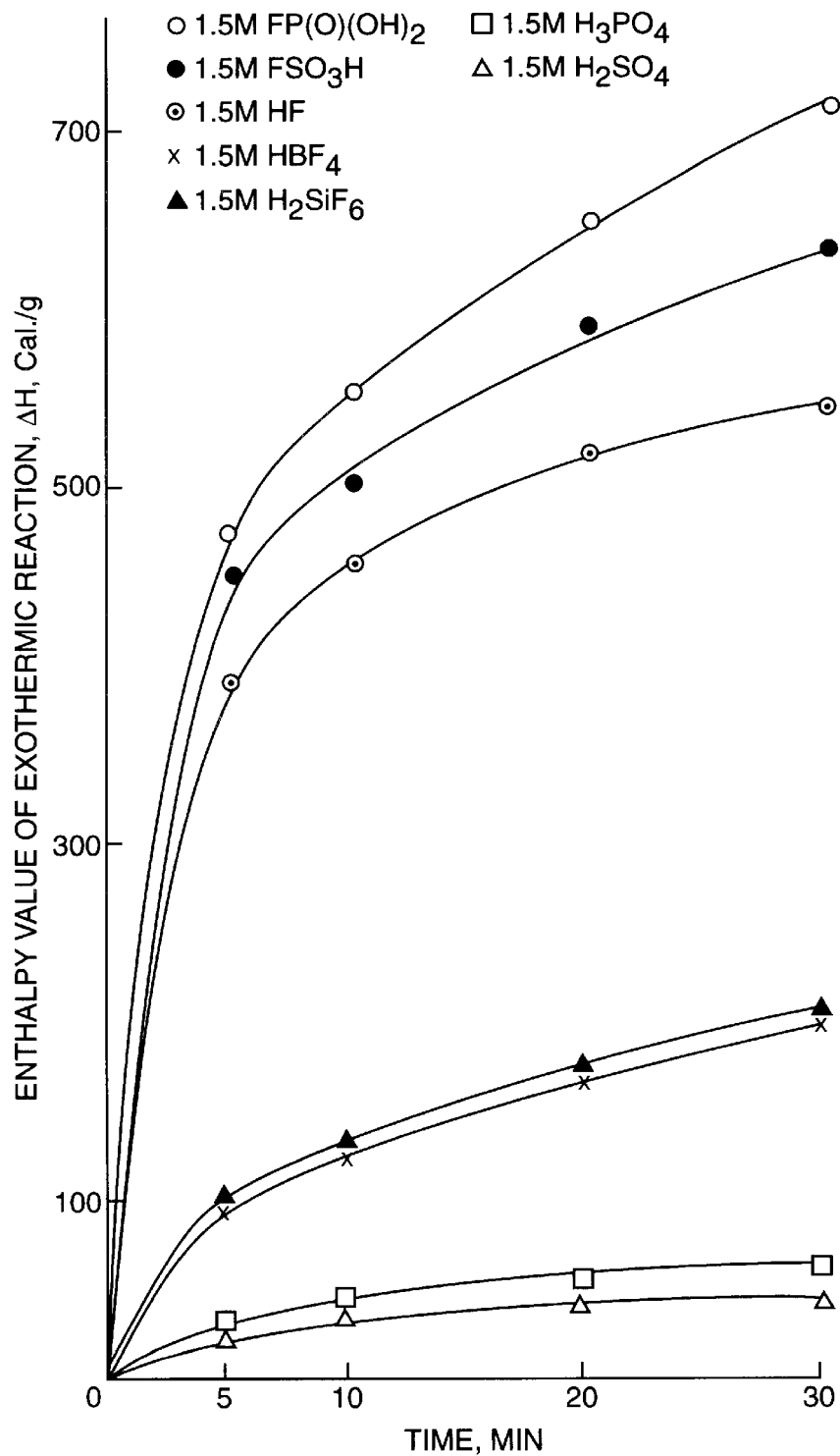
FIG. 3 is a graph of enthalpy value $\Delta H$, as a function of time generated by exothermic reaction between chrysotile fibers and various chemical reagents.

SC curves for all 1 gram samples showed the typical exothermic features as a function of time. From the curves, the exothermic energy expressed as the enthalpy value, $\Delta H$, (cal./g) of exothermic reaction at each elapsed time for 5, 10, 20, and 30 min, was computed using the following formula: $\Delta H=\Delta Tc \cdot e/m$, where $\Delta Tc$, e, and m refer to the corrected temperature rise (° C.), the energy equivalent of calorimeter (cal./° C.), and the amount of asbestos samples in grams, respectively. FIG. 3 shows the changes in enthalpy value, $\Delta H$, evolved by the chrysotile samples and reagent reactions as a function of time. As shown in FIG. 3, the $\Delta H$ values for all the samples increased with elapsed reaction times up to 30 minutes.

The results allowed us to screen the most reactive reagent from among them. From comparing the SC curves, these reagents could be classified into three groups: the first group included $FP(O)(OH)_2$, $FSO_3H$, and HF which were high $\Delta H$-generating reagents; the second group included $H_2SiF_6$ and $HBF_4$ which were moderate $\Delta H$-generating reagents; and the third group included $H_3PO_4$ and $H_2SO_4$ which were $\Delta H$-generating reagents. The chemical reagents in the first group generated an $\Delta H$ of >300 cal./g within the first 5 minutes. After 30 minutes, the highest $\Delta H$ of 711 cal./g, was obtained from the $FP(O)(OH)_2$ system. The $\Delta H$ of the $FSO_3H$ system had the 20 second highest value, although it was approximately 11% lower than that of $FP(O)(OH)_2$. An increase in the value of $\Delta H$ represented a high rate of chrysotile-reagent reaction; thus the rate of the exothermic reaction between chrysotile and $FP(O)(OH)_2$ is higher than that of chrysotile with $FSO_3H$. As a result, the extent of reactivity of reagents with chrysotile was found to be in the following order: $FP(O)(OH)_2>FSO_3H>HF>>H_2SiF_6>HBF_4>>H_3PO_4>H_2SO_4$.

Without being bound by theory, the equilibrium relation followed by $FP(O)(OH)_2$ in aqueous medium was as follows: $FP(O)(OH)_2+H_2O=HF+H_3PO_4$. Additionally, because the reactivity of $H_3PO_4$ to chrysotile was somewhat higher than that of $H_2SO_4$, it is believed that a combination of the two different reactants, HF and $H_3PO_4$, could enhance the rate of the exothermic reaction with chrysotile more effectively than a combination of HF—$H_2SO_4$ system, which corresponds to the equilibrium relation of $FSO_3H$ in aqueous solution. FPA also was expected to be more effective than HF alone. Thus, the enthalpy value for $FP(O)(OH)_2$-treated chrysotile could be interpreted as the total of reaction energy evolved from the two different reactions; one was the acid-base reaction occurring between $H_3PO_4$ as a liquid acid reactant released from $FP(O)(OH)_2$ and the $Mg(OH)_2$ layers as a solid base reactant in the chrysotile, and the other was the fluorinating reaction of HF from $FP(O)(OH)_2$, with the Si portion in silicious layers of chrysotile.

Comparative Example 2

Figure 4:
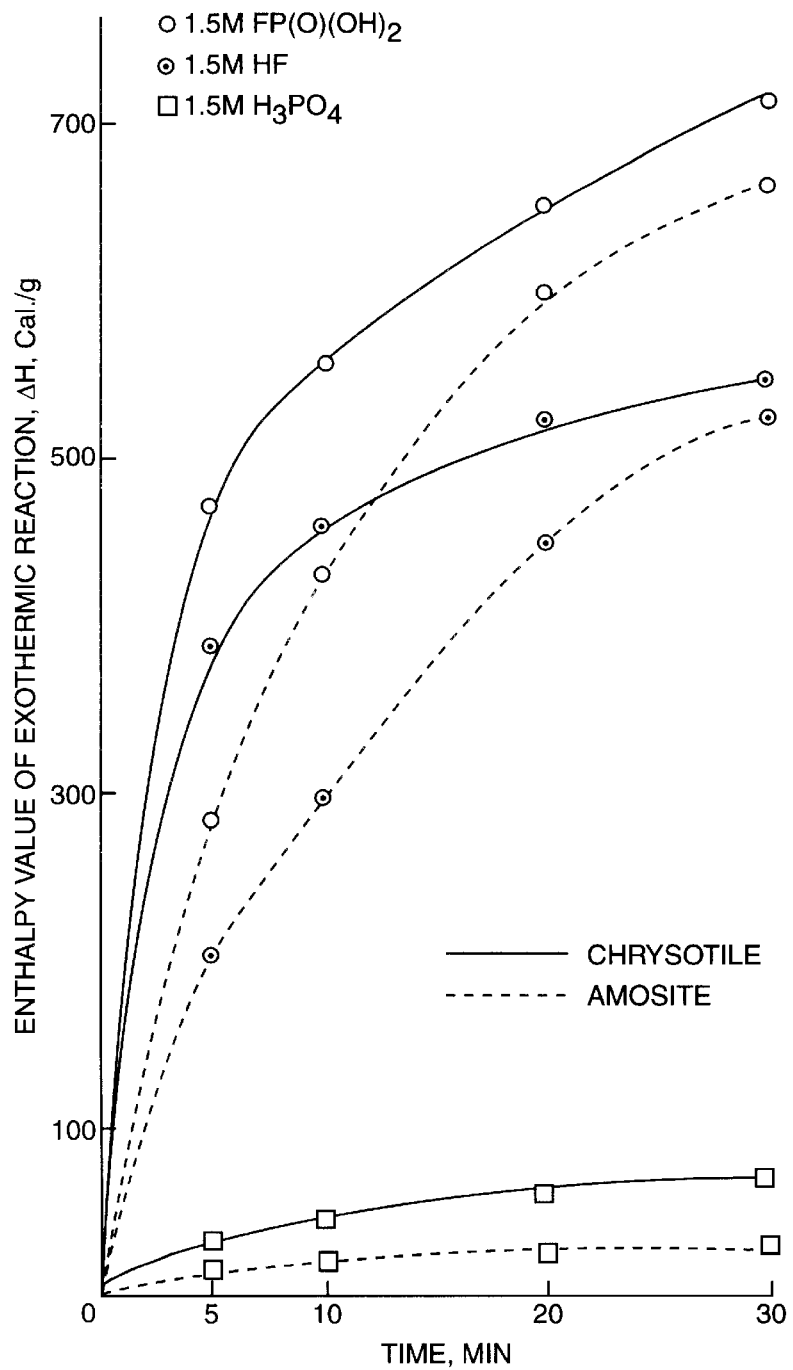
FIG. 4 illustrates a comparison between enthalpy values of exothermic energy generated from chrysotile and amosite samples treated with 1.5 M $FP(O)(OH)_2$, HF, and 1.5 M $H_3PO_4$.

As a result of the screening in Comparative Example 1, $FP(O)(OH)_2$ was tested as a reagent for decomposing other asbestos fibers. For comparison purpose with $FP(O)(OH)_2$, two reference reagents, HF and $H_3PO_4$, were used to gain a better understanding of the reaction mechanisms between $FP(O)(OH)_2$ and chrysotile and/or amosite fibers. The pathways of decomposition of asbestos by $FP(O)(OH)_2$ were also investigated. FIG. 4 provides a comparison between $\Delta H$ values generated by 1 gram each of chrysotile and amosite fibers treated with 1.5 M $FP(O)(OH)_2$ and a combined solution of 1.5 M HF, and 1.5 M $H_3PO_4$, respectively.

The enthalpy-time graphs shown in FIG. 4 illustrate that the $\Delta H$ values depend on the following three parameters: (1) chemical reagents; (2) species of asbestos; and (3) elapsed reaction time. For the first parameter, $FP(O)(OH)_2$ generated the highest exothermic energy in both chrysotile and/or amosite. The susceptibility of amosite to reaction with these chemical reagents, (parameter 2), was less than that of the chrysotile because of the lower $\Delta H$ value. In particular, the chemical affinity of amosite for $H_3PO_4$ was extremely poor, as reflected in the $\Delta H$ value of less than approximately 40 cal./g, suggesting that amosite had good resistance to its attack. For $FP(O)(OH)_2$-treated amosite, the values generated in the first 10 minutes were considerably lower than those for $FP(O)(OH)_2$-treated chrysotile samples.

Figure 5:
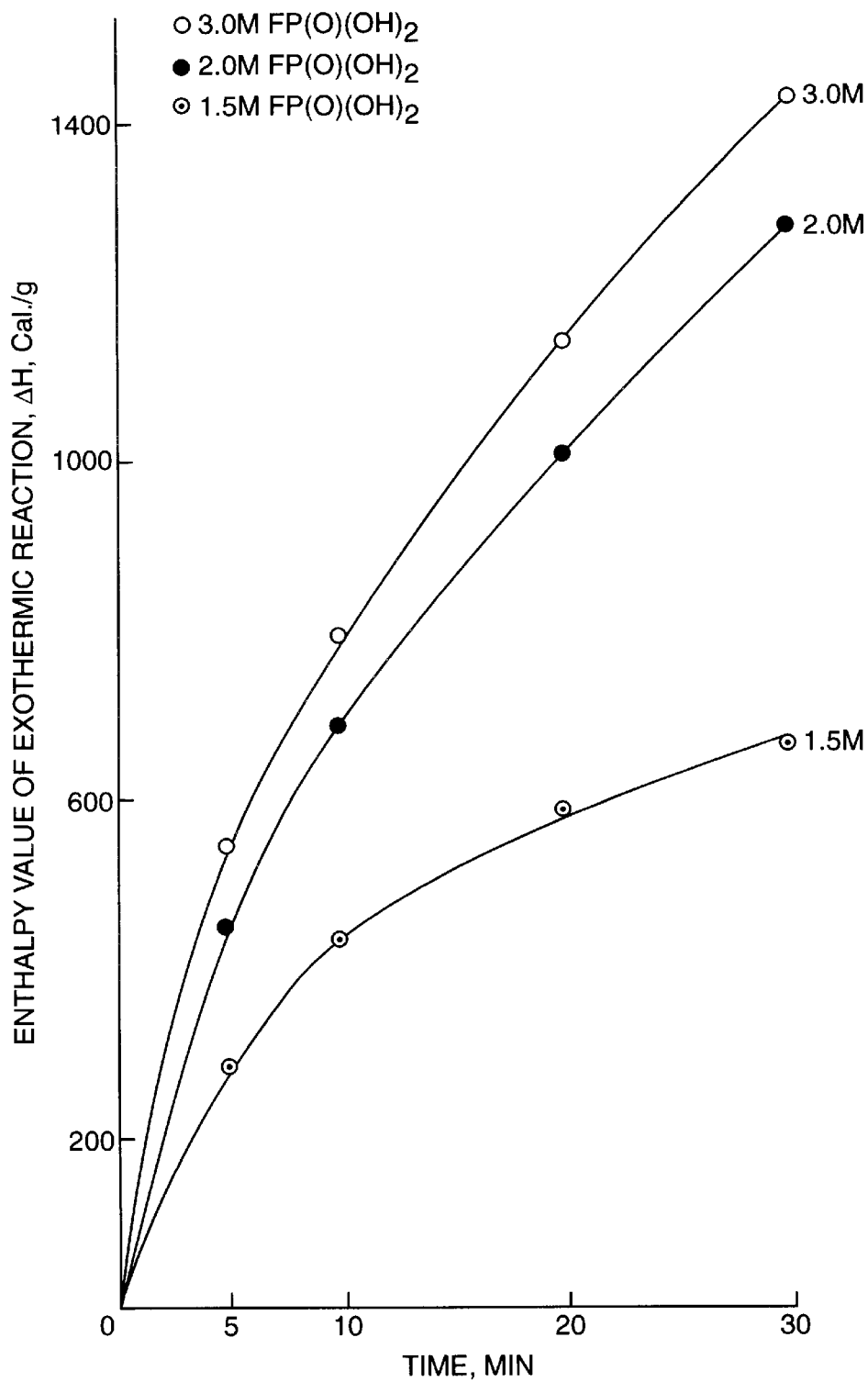
FIG. 5 shows changes in $\Delta H$ of amosite samples treated with 1.5 M, 2.0 M, and 3.0 M $FP(O)(OH)_2$.

FIG. 5 shows the $\Delta H$-time relation of $FP(O)(OH)_2$-treated amosite fibers. As expected, increasing the concentration of $FP(O)(OH)_2$ from 1.5 M to 2.0 M led to high evolution of exothermic energy. A $\Delta H$ of >600 cal./g was attained in a reaction time of only 10 minutes. Approximately 1260 cal./g evolved after 30 minutes, which was twice the amount of the value of $\Delta H$ obtained for the sample treated with 1.5

M-FP(O)(OH)$_2$. This result verified that the extent of reactivity of FP(O)(OH)$_2$ to amosite was dramatically enhanced by increasing its concentration. However, no significant changes in the extent of reactivity was found when amosite was treated with a 3.0 M solution of FP(O)(OH)$_2$. The ΔH evolved after 30 min was 1430 cal./g, corresponding to an increase of only about 14% over ΔH obtained for amosite samples treated with 2.0 M. ΔH values of chrysotile treated with 2.0 and 3.0 M FP(O)(OH)$_2$ were higher than those obtained from amosite samples as shown in FIG. 5.

Example 3

A. Leaching of Ionic Species

To determine the concentration of ionic species, such as Mg, Fe, and Mn cations, and silicate anion leached from chemically treated asbestos, solution samples were prepared as described below. A sample of 0.4 grams of asbestos was placed in a plastic tube. 14 grams of the chemical reagents poured in the tube, followed by soaking for 48 hrs at room temperature, without any physical agitation. Then, the mixture of asbestos and chemical reagent was filtered through a 0.45 μm millipore filter. The concentration of ionic species present in the filtered solution was measured by atomic absorption spectrometry (AA). Deionized water of pH 6.5 was used as a control solution. The colloidal and solid residues remaining on the filter were washed with a deionized water to remove any extra chemical reagent adsorbed to the conversion products and unreacted asbestos, and then dried for about 16 hrs in an oven at 110° C. The dried residues were analyzed to identify the amorphous and crystalline reaction products and by-products of asbestos, and also to estimate the extent of decomposition of asbestos fibers, using fourier transform infrared spectroscopy (FT-IR; Model 1600, Perkin Elmer) and x-ray powder diffraction (XRD; Phillips Electronic Instruments).

For FT-IR analysis, disks were made by mixing 200 mg of KBr and 3 to 4 mg of the asbestos sample that had been ground to a powder by using mortar and pestle. This powder sample was also used for XRD examination. X-ray photoelectron spectroscopy (XPS; CLAM 100, VG Scientific Ltd., Sussex England) was employed to identify the chemical states and atomic fractions of the conversion products at the interfaces between the asbestos fibers and the chemical reagents. The excitation radiation was provided by an Al Kα (1486.6 eV) X-ray source operated at a constant power of 200 W. The vacuum in the analyzer chamber of the instrument was maintained at $10^{-9}$ torr ($\approx 1.33 \times 10^{-7}$ Pa) throughout.

In preparing the XPS samples, the asbestos fibers used as substrate were made into disks, 12 mm in diameter and 0.5 to 1.0 mm thick, prepared by pressing asbestos fibers at 100 Mpa. To precipitate the conversion products on the asbestos disk surfaces, the disks were dipped for a few seconds into chemical reagents. Then, the samples were left in air at room temperature for about 2 hrs, and finally dried for 24 hrs in a vacuum oven at 60° C. The thickness of layers which were explored for superficial interaction by XPS was ≈5 nm, corresponding to the escape depth of an aluminum photoelectron at an electron take-off angle of 38°.

B. Decomposition of Chrysotile Asbestos

The data resulting from the above experiments are summarized in Table 1 below.

TABLE 1

Concentrations of Ionic Species Lixiviated from Chrysotile and Amosite Fibers After Immersing them for 2 days in Deionized Water, and separately in Solutions of 1.5 M H$_3$PO$_4$, 1.5 M HF, and 1.5 M, 2.0 M, and 3.0 M FP(O)(OH)$_2$

| Chemical reagent | Asbestos | Lixiviated ions, μg/ml | | | |
|---|---|---|---|---|---|
| | | Mg | Fe | Mn | Silicate |
| D.I. water | Chrysotile | $4.8 \times 10^{-1}$ | 0.0 | 0.0 | $1.2 \times 10^{-2}$ |
| 1.5M H$_3$PO$_4$ | Chrysotile | 1.1 | 0.0 | 0.0 | $8.3 \times 10^{-2}$ |
| 1.5M HF | Chrysotile | 3.8 | 0.0 | 0.0 | 7.0 |
| 1.5M FP(O)(OH)$_2$ | Chrysotile | 4.8 | 0.0 | 0.0 | 9.8 |
| 2.0M FP(O)(OH)$_2$ | Chrysotile | 5.7 | 0.0 | 0.0 | $1.1 \times 10$ |
| 3.0M FP(O)(OH)$_2$ | Chrysotile | 5.8 | 0.0 | 0.0 | $1.2 \times 10$ |
| D.I. water | Amosite | $2.2 \times 10^{-3}$ | $1.6 \times 10^{-2}$ | $8.0 \times 10^{-4}$ | $2.0 \times 10^{-2}$ |
| 1.5M H$_3$PO$_4$ | Amosite | $5.5 \times 10^{-2}$ | $3.8 \times 10^{-1}$ | $2.6 \times 10^{-3}$ | $8.0 \times 10^{-2}$ |
| 1.5M HF | Amosite | $1.2 \times 10^{-4}$ | 1.3 | $1.1 \times 10^{-2}$ | 2.1 |
| 1.5M FP(O)(OH)$_2$ | Amosite | $3.4 \times 10^{-1}$ | 3.2 | $2.5 \times 10^{-2}$ | 3.8 |
| 2.0M FP(O)(OH)$_2$ | Amosite | $5.0 \times 10^{-1}$ | 4.7 | $3.4 \times 10^{-2}$ | 7.5 |
| 3.0M FP(O)(OH)$_2$ | Amosite | $5.4 \times 10^{-1}$ | 5.0 | $3.8 \times 10^{-2}$ | 7.9 |

Table 1 above illustrates that the principal ions released from the decomposition of chrysotile were Mg and silicate. When chrysotile was immersed into deionized water of neutral pH, the amount of Mg and silicate ions dissociated was $4.8 \times 10^{-1}$ and $1.2 \times 10^{-2}$ μg/ml, respectively. In contrast, a pronounced leaching of Mg was observed from the 1.5 M H$_3$PO$_4$-treated asbestos; the value of 1.1 μg/ml corresponded to an increase of one order of magnitude above that of the control, but there was no marked leaching of silicate. This information indicated that the external Mg(OH)$_2$ layers of tubular chrysotile structure were vulnerable to strong acid, but there was no significant damage of the inner silicious layers. The acid-inert interweaved silicious layers readily reacted with fluoride ions. Such a fluorinating reaction led to the cleavage of the Si—O—Si linkages within the SiO$_4$ tetrahedra, thereby destroying the fibrous structure of chrysotile. Thus, the 1.5 M HF solution which released two ionic reactants, H$^+$ and F$^-$, not only acted to dissociate a large amount of silicate ions, but also further increased the leaching of Mg ions. The amount of dissociated silicate, 7.0 μg/ml, was an enhancement of two orders of magnitude over that obtained for chrysotile samples treated with 1.5 M H$_3$PO$_4$.

The following explanation is provided for the abundant release of magnesium and silicate ions from chrysotile. First, the hydrogen ions favorably reacted with the surface hydroxyl groups to promote the hydrolysis of Mg(OH)$_2$ octahedral layers, while the fluoride ions passed through the damaged Mg(OH)$_2$ surface layers and initiated the fluorination reactions with the silica portion of Si—O—Si linkages in the inner silicious layers. The former action lead to the leaching of Mg ions from chrysotile, and the latter one was related directly with the limitation of silicate ions caused by cleavage of Si—O—Si linkages. When a 1.5 M $FP(O)(OH)_2$ solution was used Mg and silicate ions of 4.8 and 9.8 μg/ml, respectively, were leached. These amounts were higher than those leached from HF treated chrysotile. A further increase in leaching of these ions was obtained from chrysotile samples treated with 2.0 M $FP(O)(OH)_2$. However, no significant enhancement in the amount of Mg and silicate ions was found in chrysotile samples treated with 3.0 M $FP(O)(OH)_2$. This finding suggested that the most effective concentration of $FP(O)(OH)_2$ useful to achieve the maximum leaching from chrysotile asbestos is around 2.0 M.

C. Decomposition of Amosite Asbestos

In amosite asbestos, Mg, Fe and Mn are sandwiched between two silicious layers. Therefore, in order to monitor the extent of decomposition of amosite fibers, ionic species of Mg, Fe, Mn and silicate were monitored. Amounts of these ionic species were released from amosite into deionized water as shown in Table 1. The release of ionic species from amosite asbestos immersed into 1.5M $H_3PO_4$ solution increased appreciably over that obtained in deionized water as shown in Table 1. Leaching caused by immersion into $H_3PO_4$ was relatively poor because the amosite structure showed resistance to conversion by $H_3PO_4$. By contrast, pronounced leaching enhanced by approximately two orders of magnitude as compared with leaching in deionized water, was achieved for amosite samples immersed in 1.5 M HF. It is possible that such high leaching behavior was due to the dissociation of superficial silicious layers caused by the fluorinating reaction between F and Si in $SiO_4$ tetrahedra. Correspondingly, this dissociation increasingly promoted the release of cations from the $R^{2+}O_6$ and $R^{3+}O_6$ octahedral layers lying underneath the silicious layers.

A more pronounced leaching of the Mg, Fe and Mn ions, as compared to that obtained with the 1.5M $H_3PO_4$ and 1.5M HF solutions was observed for $FP(O)(OH)_2$-treated amosite samples as shown in Table 1. Increasing the concentration of $FP(O)(OH)_2$ to 2.0 M increased further the release of large amounts of these ions. However, no significant increase in the amount of these ions was found when treating amosite fibers with 3.0 M $FP(O)(OH)_2$ as compared with the amount of ions released by amosite treated with 2.0 M FPA. This finding was similar to that obtained from samples of chrysotile treated with $FP(O)(OH)_2$. The 2.0 M $FP(O)(OH)_2$ solution displayed maximum dissociation of amosite after treatment periods for 2 days.

Example 4

Conversion Products and By-Products

To elucidate comprehensively the reaction mechanisms and decomposition pathways, it is important to identify the conversion products and by-products formed in the exothermic reactions between the asbestos and aqueous solutions of $FP(O)(OH)_2$, HF and $H_3PO_4$. The solid residues remaining in the ion-leaching tests of Example 3 were washed with deionized water to remove any extra chemical adsorbed to the conversion products and non-reacted asbestos. The washed samples were dried for approximately 16 hrs in an oven at 110° C. for FT-IR and XRD analyses. The conversion products identified by these analyses were the chemical compounds which were less susceptible and nonsusceptible to hydrolysis.

A. Chrysotile Asbestos

Figure 6:
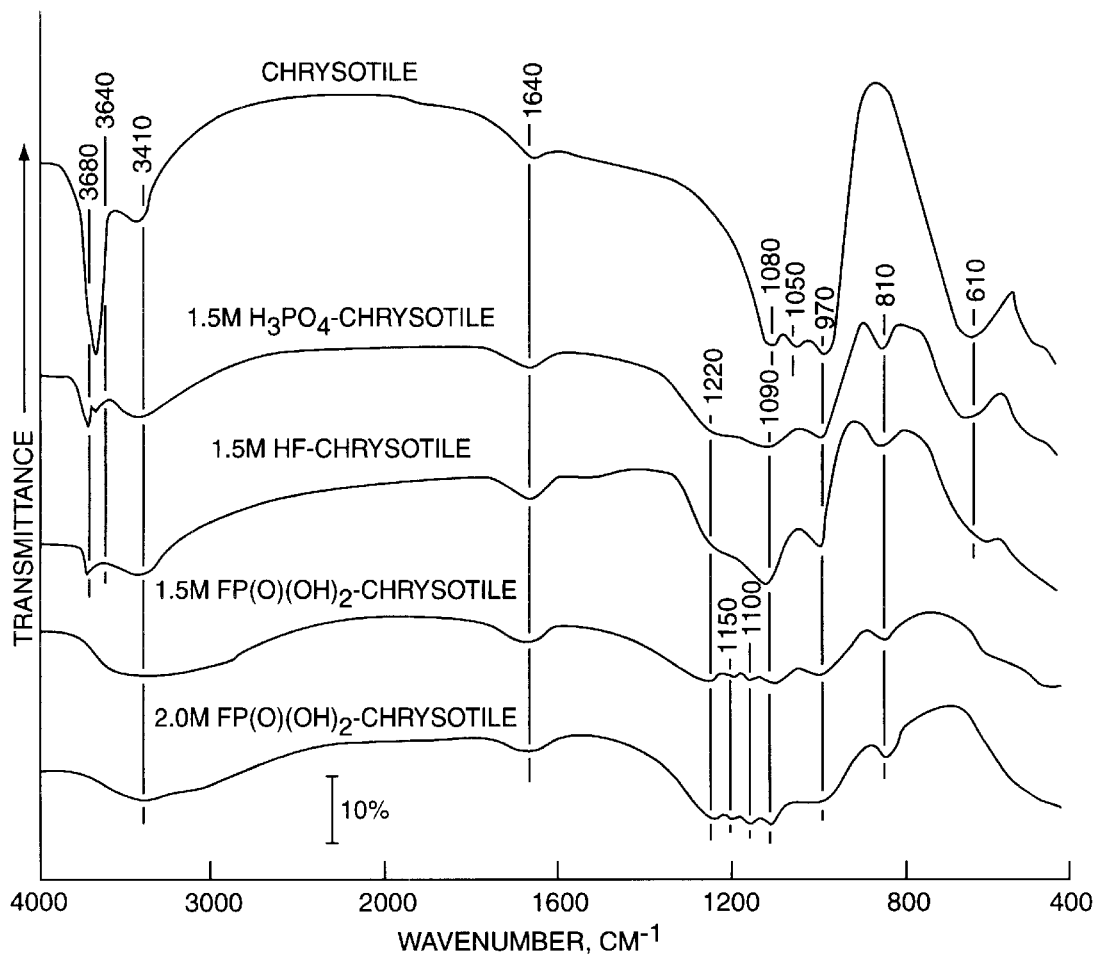
FIG. 6 is a FT-IR spectra for the untreated, and chrysotile fiber samples treated with 1.5 M $H_3PO_4$, 1.5 M HF, 1.5 M $FP(O)(OH)_2$ and 2.0 M $FP(O)(OH)_2$.

FIG. 6 shows FT-IR spectra for untreated, and chrysotile samples treated with 1.5 M $H_3PO_4$, 1.5 M HF, 1.5 M $FP(O)(OH)_2$ and 2.0 M $FP(O)(OH)$ over frequency ranges from 4000 to 400 $cm^{-1}$. As shown in FIG. 4, a typical spectrum of untreated chrysotile included eight absorption bands as follows: a stretching vibration of hydroxyl H—O in magnesium hydroxides [$Mg(OH)_2$] and underlayers at 3680 $cm^{-1}$ peak and 3640 $cm^{-1}$ shoulder; stretching and bending modes of H—O in free or crystal $H_2O$ at 3410 and 1640 $cm^{-1}$ peaks, respectively; a Si—O—Si antisymmetric stretching of bridging oxygens within the $SiO_4$ tetrahedra at 1080 $cm^{-1}$, a Si—O—Mg stretching frequency at 1050 $cm^{-1}$; a Si—O stretching mode of nonbridging oxygens at 970 $cm^{-1}$; and, a Mg—O stretching at 610 $cm^{-1}$.

When chrysotile asbestos was treated with 1.5 M $H_3PO_4$, different spectral features from that of untreated chrysotile emerged. The following were observed: (1) a considerable reduction of peak intensity at 3680 and 3640 $cm^{-1}$, reflecting $Mg(OH)_2$ and an underlayer of SiOH-related OH groups; (2) an appearance of new bands at 1220, 1090, and 810 $cm^{-1}$; (3) a disappearance of 1080 and 1050 $cm^{-1}$ frequencies, relating to the Si—O—Si and Si—O—Mg linkages, respectively; and (4) a decrease in intensity of the nonbridging oxygen Si—O and Mg—O peaks at 970 and 610 $cm^{-1}$, respectively. Also, the spectrum had a broad absorption band in the frequency range from 1220 to 1090 $cm^{-1}$, suggesting other unknown peaks. With respect to the second characteristic the new bands were attributed to the formation of hydrated silica ($SiO_2$) as silica gel.

From the results obtained in connection with different spectral feature (1), (3), and (4), it was concluded that $H_3PO_4$ had a strong affinity for external $Mg(OH)_2$ layers, thereby initiating acid-base reactions with $Mg(OH)_2$. This reaction not only led to the hydrolysis of $Mg(OH)_2$ layers, but also contributed to the breakage of Si—O—Mg and Si—O—Si linkages. The latter phenomenon precipitated the formation of silica gel as a reaction by-product. The formation of silica gel also explained why a large amount of Mg ions and fewer silicate anions leached out from chrysotile. The spectrum of FIG. 6 of chrysotile asbestos treated with 1.5M $H_3PO_4$ also suggested that some unreacted chrysotile fibers remain in the samples because of the presence of chrysotile-related weak absorptions at 3680, 3640, 970, and 610 $cm^{-1}$.

By comparison with the spectrum of $H_3PO_4$-treated chrysotile samples, the spectrum of 1.5 M HF-treated chrysotile fibers disclosed the following four characteristics: (1) a further reduction of peak intensity at 3680 $cm^{-1}$; (2) the elimination of the underlayer SiOH-related band at 3640 $cm^{-1}$; (3) the expression of a strong signal at 1090 $cm^{-1}$ frequency; and (4) the transformation of the peak at 610 $cm^{-1}$ into a shoulder one. These characteristics indicated that chrysotile is quite vulnerable to attack by HF which released two important ionic reactants, acid ($H^+$) and fluoride ($F^-$). The released hydrogen ions are strongly attracted to the surface hydroxyl groups of $Mg(OH)_2$ layers; namely, acid-base reactions between $H^+$ from HF and OH from $Mg(OH)_2$ led to the hydrolysis of the external $Mg(OH)_2$ layers, reflecting characteristics (1) and (4). Although such a chrysotile→silica gel phase conversion was similar to that of the chrysotile samples treated with the $H_3PO_4$ alone, once the outer $Mg(OH)_2$ layers were hydrolyzed, the $SiO_4$ tetrahedra underwent fluorinating reactions caused by the attack of ($F^-$) ions diffusing through the interleaved silicious layers. This reaction further promoted the precipitation of silica gel caused by the cleavages of Si—O—Si and Si—O—Mg linkages, which accounted for characteristics (2) and (3).

Considering that a large amount of silicate anion was lixiviated, the silica gel by-products seemed to be very susceptible to fluorinating-caused dissolution. In other words, the release of surplus (F$^-$) ions from HF reacted with silica gel to promote their further dissolution. This interpretation reasonably accounted for the decomposition pathways of chrysotile by HF by a two-step reaction route, i.e., acid-base and fluorinating reactions, which also played an important role in accelerating the rate of conversion of chrysotile fibers into non-regulated materials, as compared to rate of conversion of chrysotile treated with $H_3PO_4$ acid alone. A decomposition pathway of chrysotile by HF could be stated as follows:

chrysotile+H$^+$+F$^-$→silica gel+F$^-$→dissolution.

The spectral feature of FIG. 6 also suggested that the concentration of acid in 1.5 M HF solution was not enough to hydrolyze completely the $Mg(OH)_2$ layers because of the presence of a weak peak at 3680 cm$^{-1}$, denoting a certain amount of non-reacted chrysotile remaining in the samples.

In contrast, when chrysotile was treated with 1.5 M FP(O)(OH)$_2$ a high rate of acid-base reaction was generated, corresponding to the elimination of $Mg(OH)_2$ layers. Additionally, the rates of chrysotile→silica gel→dissolution phase conversion, caused by the attack of (F$^-$) ions on the $Mg(OH)_2$-depleted silicious layers and silica gel by-products were also enhanced. The former phenomenon was evidenced by the lack of prominent peaks at 3680 and 610 cm$^{-1}$, belonging to the $Mg(OH)_2$ in the spectrum of this sample. The latter could account for a more pronounced leaching of silicate anions from chrysotile, as compared with leaching from the HF-treated chrysotile samples. In addition, this spectrum showed broad absorptions between 1120 cm$^{-1}$ and 970 cm$^{-1}$, containing at least five resolvable peaks at 1220, 1150, 1100, 1090, and 970 cm$^{-1}$.

Assuming that the bands at 1220, 1090, and 970 cm$^{-1}$ were due to the formation of silica gel and nonbridging oxygen of Si—O group, the other bands at 1150 and 1100 cm$^{-1}$ were more likely to be associated with ionic P—O stretching in the orthophosphate compounds as reaction products, rather than to those of Si- and F-related reaction products. However, it was uncertain whether these bands were associated with the tribasic (PO$_4^{3-}$), dibasic (HPO$_4^{2-}$), or monobasic (H$_2$PO$_4^-$) derivatives. Spectral features similar to those of 1.5 M FP(O)(OH)$_2$ were illustrated for the 2.0 M of FP(O)(OH)$_2$ as shown in FIG. 6. Again, it is believed that a two-step reaction route, acid-base and fluorinating reactions, occurring between chrysotile and FP(O)(OH)$_2$ was responsible for accelerating considerably the rate of chrysotile→non-regulated material conversion, thereby destroying the fibrous nature of the asbestos in a short time.

Figure 7:
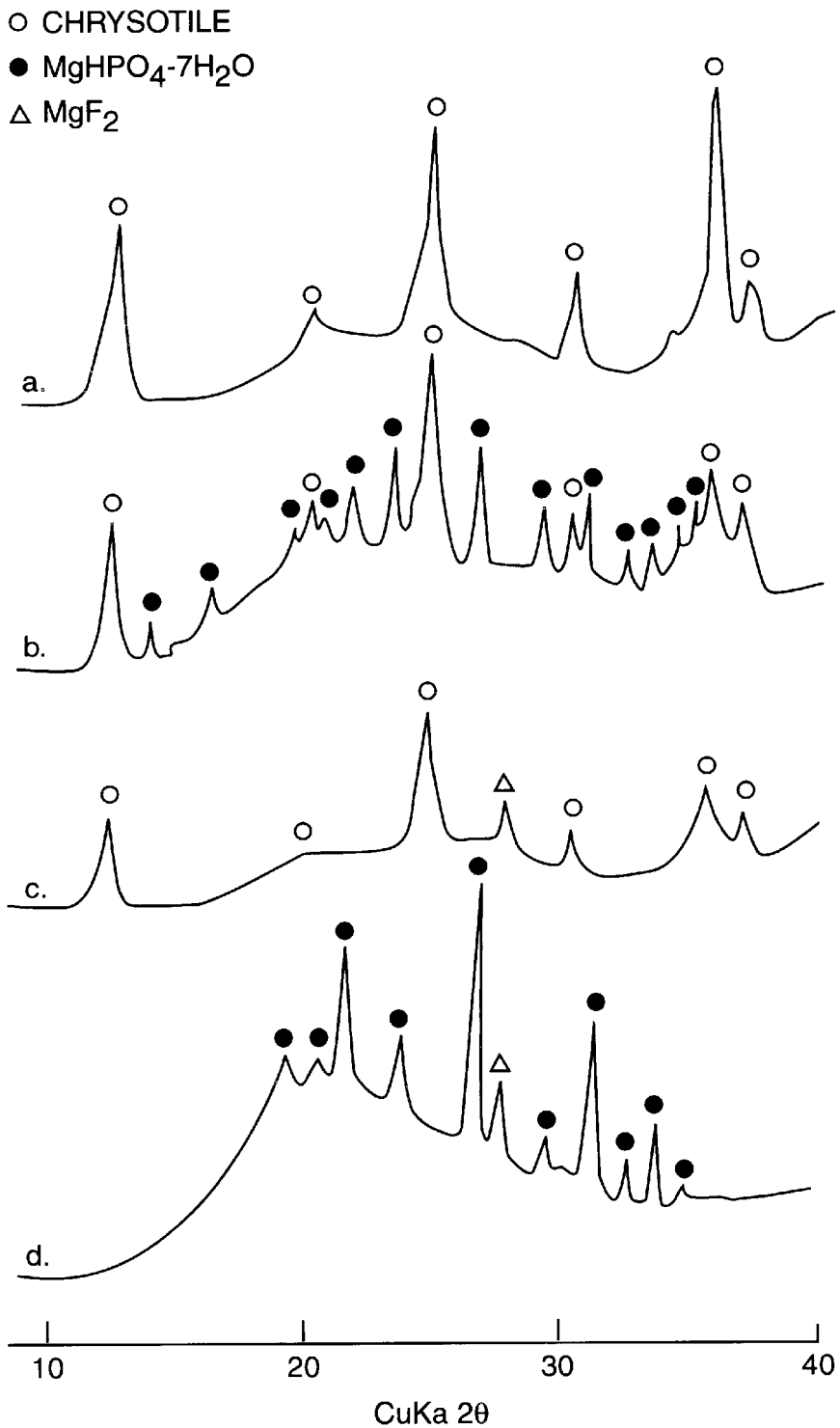
FIG. 7 shows XRD patterns of chrysotile asbestos samples treated with (a) 1.5 M $H_3PO_4$, (b) 1.5 M HF, and (c) 1.5 M $FB(O)(OH)_2$.

The results offered from the FT-IR study were confirmed by XRD tracings, from 0.11 to 0.23 nm. The same samples as those used in the FT-IR study were used as shown in FIG. 7. Using 1.5 M $H_3PO_4$ solution, the diffraction pattern (b) indicated the presence of magnesium hydrogen orthophosphate hydrate, $MgHPO_4 \cdot 7H_2O$, as the crystalline reaction product, while retaining the strong chrysotile-related d-spacings. Correspondingly, it is believed that the ionic P—O stretching bands found in the FT-IR spectrum were due to the dibasic derivative (HPO$_4^{2-}$) in the $MgHPO_4 \cdot 7H_2O$ compound formed by the acid-base reaction between $H_3PO_4$ and the $Mg(OH)_2$ in chrysotile according to the following equation: $Mg(OH)_2+H_3PO_4 \rightarrow MgHPO_4+2H_2O$.

As seen from the XRD tracing 7 (c), 1.5 M HF precipitated a crystalline magnesium fluoride, $MgF_2$ (sellaite) phase as the reaction product, in conjunction with prominent lines of non-reacted chrysotile. Pattern (d) represents chrysotile treated with 1.5 M FP(O)(OH)$_2$. Pattern (d) is characterized by the inclusion of two crystalline reaction products, $MgHPO_4 \cdot 7H_2O$ and $MgF_2$; there were no clear d-spacings of chrysotile. Relating this finding to the FT-IR results, it appears that the reaction between chrysotile and 1.5M FP(O)(OH)$_2$ led to the precipitation of hybrid components containing amorphous silica gel, and crystalline $MgHPO_4 \cdot 7H_2O$ and $MgF_2$.

B. Amosite Asbestos

Figure 8:
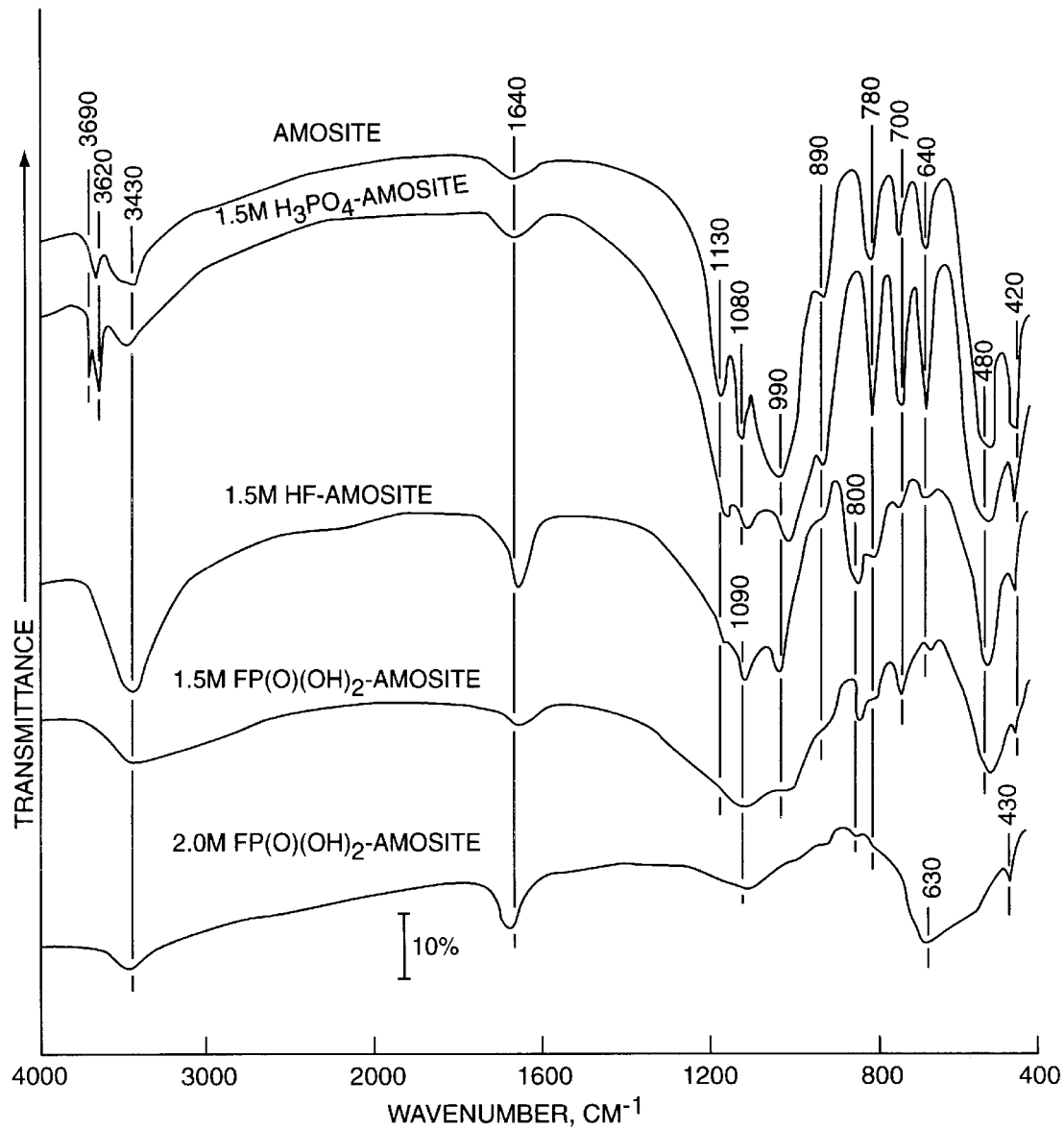
FIG. 8 is FT-IR spectra of amosite fibers treated with 1.5 M $H_3PO_4$, 1.5 M HF, 1.5 M $FP(O)(OH)_2$ and 2.0 M $FP(O)(OH)_2$.

FIG. 8 shows the FT-IR spectra of amosite samples, untreated, and treated with 1.5 M $H_3PO_4$, 1.5 M HF-, 1.5 M FP(O)(OH)$_2$, and 2.0 M FP(O)(OH)$_2$. The assignments of each absorption bands for untreated amosite fibers were as follows: bands at 3690 and 3620 cm$^{-1}$ were due to the H—O stretching vibration in Si—OH groups; bands at 3430 and 1640 cm$^{-1}$ were due to H—O stretching and bending vibrations of free or crystal water, respectively; the bands at 1130 cm$^{-1}$, and at 1080 cm$^{-1}$ were ascribed to the Si—O—Si antisymmetric stretching mode of bridging oxygens in the SiO$_4$ tetrahedra; the band at 990 cm$^{-1}$ corresponded to the Si—O stretching of nonbridging oxygens; the bands at 640 cm$^{-1}$ and 890 cm$^{-1}$, were related to both the H—O bending and Si—O stretching of SiOH groups; the band at 780 cm$^{-1}$ reflected Si—O—Si symmetric stretching of bridging oxygens between tetrahedra; and, the bands at 480 cm$^{-1}$ and 420 cm$^{-1}$ belonged to Si—O—Si and O—Si—O bending modes overlapping the stretching vibration of cation-oxygen bonds in the R$^{2+}$O$_6$ and R$^{3+}$O$_6$ octahedral layers. By comparison with the bands for untreated amosite, no particular changes in spectral feature could be seen on the 1.5 M $H_3PO_4$-treated amosite samples, all indicating that the amosite was unsusceptible to the reaction with 1.5 M $H_3$ PO$_4$.

When the amosite fibers were immersed into a 1.5 M HF solution, there were two striking differences in spectral features; one was a considerable reduction of peak intensity at 3690, 3620, 1130, 1080, 890, 780, and 640 cm$^{-1}$, and the other was the appearance of a new absorption band at 1090 cm$^{-1}$ and sharp doublet peaks in the absorption range from 820 to 750 cm$^{-1}$. The former result represented the fact that the reaction between HF and amosite led to the breakage of Si—O bonds in Si—O—Si linkages and Si—OH groups. The contributors to this new intense absorption band and the newly developed doublet peaks were attributed to the formation of a quartz, $SiO_2$ phase as a reaction by-product. HF favorably reacted with the surface SiO$_4$ tetrahedra to precipitate the quartz. In fact, the strong bands at 480 and 420 cm$^{-1}$, originating from the cation-oxygen bonds, still remained in this spectrum. A further decrease in the intensity of the Si—O—Si— and Si—OH-related peaks was recognizable in the spectrum of 1.5 M FP(O)(OH)$_2$ treated amosite samples. As expected, the peaks at 1090, 800, and 780 cm$^{-1}$ indicated that quartz by-products precipitated into this sample. The data also demonstrated that the extent of intensity of the quartz-related peaks was somewhat lower than that of the HF-treated samples. A considerable lowering of these peaks was observed from 2.0 M FP(O)(OH)$_2$-treated samples, while the amosite-related peaks disappeared from the spectrum, instead of the growing of new bands at 630 and 430 cm$^{-1}$. This finding clearly verified that increasing the concentration of FP(O)(OH)$_2$ to 2.0M not only completely converted amosite into non-regulated materials, but also promoted the rate of dissolution of quartz by-products by the attack of (F$^-$) ions. Thus, there was no visual observation of amosite fibers.

To identify the contributors to these new bands, we examined seven reference reaction products, $Fe_2O_3$, $Fe_3O_4$, FeO(OH), MnO, $MnO_2$, MgO, and $Mg(OH)_2$, as reference samples, by FT-IR. As a result, these peaks are more likely to be associated with the formation of manganese dioxide, $MnO_2$, rather than that of any other reference samples.

Although the role of acids released from 2.0 M FP(O)(OH)$_2$ in decomposing the amosite structure was not clear in this FT-IR study, it was clear that a large amount of (F$^-$) ions played an essential role in increasing the rate of fluorinating reaction with the surface silicious layers, thereby enhancing the amosite→quartz phase conversion followed by the dissolution of quartz. It is believed that the damage of surface silicious layers by (F$^-$) ions facilitated the penetration of FP(O)(OH)$_2$-released acids into the intermediate cation layers. Moreover, it was further believed that $H_3PO_4$ penetrated as acid reactant to react with $R^{2+}O_6$ and $R^{3+}O_6$ octahedra thereby generating an acid-base reaction. This reaction then led to the breakage of cation-oxygen bonds, thereby resulting in leaching of cations, Mg, Fe, and Mn, from the intermediate cation layers.

Figure 9:
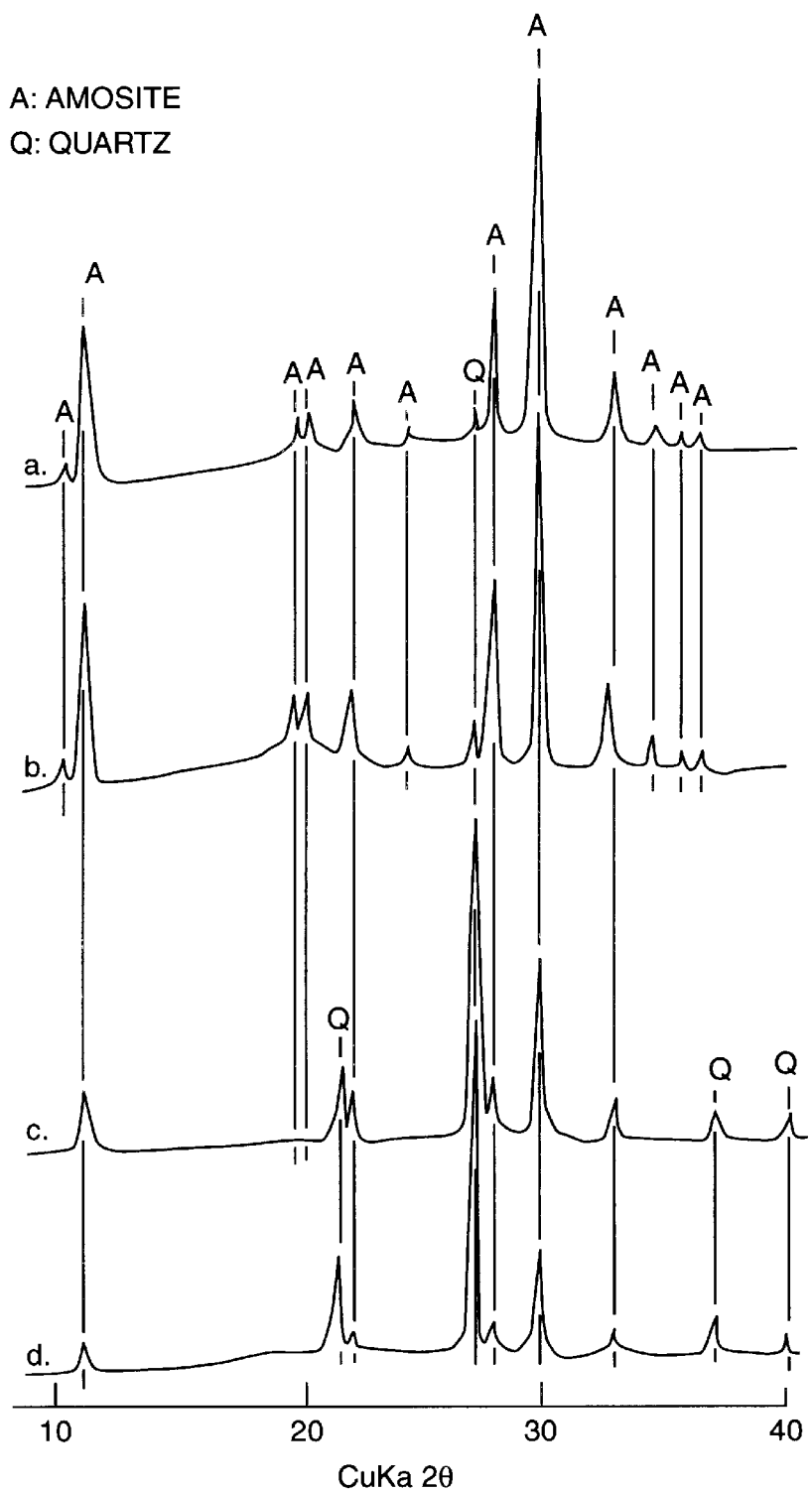
FIG. 9 shows XRD tracings of amosite fibers (a) untreated and treated with, (b) 1.5 M $H_3PO_4$, (c) 1.5 M HF, (d) 1.5 M $FP(O)(OH)_2$.

To support this information, the crystalline reaction products formed in the 1.5 M $H_3PO_4$, 1.5M HF, and 1.5M FP(O)(OH)$_2$-treated amosite were identified, by XRD. As illustrated in FIG. 9, XRD pattern (a) for the untreated amosite fibers showed that although the intensity of peak was weak, some quartz was present. No significant change in pattern feature was obtained from samples treated with $H_3PO_4$, as shown in XRD pattern (b). A further pronounced diminution of amosite-related line intensity together with the intense quartz lines was depicted in the FP(O)(OH)$_2$ samples (d), reflecting an increased rate of amosite→quartz phase conversion. The XRD pattern (not shown) of the 2.0 M FP(O)(OH)$_2$-treated samples had only a weak quartz line, while there were no amosite lines. Thus, the 2.0 M FP(O)(OH)$_2$ reagent not only completed the amosite→quartz phase conversion, but also promoted the dissolution of quartz.

C. Surface Chemistry of Conversion Products

The information described above provided the identification of conversion products which have a low solubility in water. However, water-soluble conversion products were not identified. The interactions occurring at interfaces between the chemical reagents as liquid phases, and the asbestos fibers as the solid phase were also studied. Water-insoluble and water-soluble reaction products and by-products were identified. The critical interfacial zone was explored using XPS. Internally generated $Mg_{2p}$, $Si_{2p}$, $C_{1s}$, $O_{1s}$, $F_{1s}$, $Fe_{2p3/2}$, $P_{2p}$, and $Mn_{2p3/2}$ peak areas were used to obtain atomic fractions, which were determined according to the equation:

$$C_x = I_x/S_x / \Sigma(I_i/S_i),$$

In this equation, $C_x$ is the concentration of a respective element X at the fiber's surface; $I_x$ is the peak area, defined by using the differential cross-sections for core-level excitation of element X; and $S_x$ is a sensitivity factor, i.e., 0.07, 0.17, 0.205, 0.63, 1.00, 3.80, 0.25 and 2.10 for Mg, Si, C, O, F, Fe, P, and Mn, respectively. The atomic composition expressed in percent of "as-received" chrysotile and amosite fiber surfaces was also used for comparison. The surface atomic fraction from these samples are given in Table 2 below:

TABLE 2

Atomic Composition of Untreated and 1.5M $H_3PO_4$, HF, and FP(O)(OH)$_2$-Treated Chrysotile and Amosite Asbestos Surfaces

| Chemical reagent | Asbestos | Atomic composition, % | | | | | | | | Atomic ratio, | | |
|---|---|---|---|---|---|---|---|---|---|---|---|---|
| | | Mg | Si | Fe | C | O | P | F | Mn | Mg/Si | Fe/Si | Mn/Si |
| — | Chrysotile | 31.58 | 17.31 | — | 7.18 | 43.98 | — | — | — | 1.82 | 0.00 | 0.00 |
| $H_3PO_4$ | Chrysotile | 27.00 | 10.19 | — | 6.15 | 52.25 | 4.41 | — | — | 2.65 | 0.00 | 0.00 |
| HF | Chrysotile | 23.01 | 11.70 | — | 7.13 | 52.95 | — | 5.21 | — | 1.97 | 0.00 | 0.00 |
| FP(O)(OH)$_2$ | Chrysotile | 22.22 | 16.64 | — | 6.21 | 49.84 | 3.39 | 1.70 | — | 1.33 | 0.00 | 0.00 |
| — | Amosite | 1.24 | 21.62 | 4.10 | 18.98 | 53.85 | — | — | 0.21 | 0.06 | 0.19 | 0.01 |
| $H_3PO_4$ | Amosite | 1.08 | 21.41 | 3.85 | 10.90 | 58.96 | 3.81 | — | 0.20 | 0.05 | 0.18 | 0.01 |
| HF | Amosite | 0.38 | 19.43 | 2.00 | 10.04 | 59.41 | — | 8.65 | 0.09 | 0.02 | 0.10 | 0.01 |
| FP(O)(OH)$_2$ | Amosite | 0.10 | 15.99 | 1.51 | 11.05 | 64.56 | 4.18 | 2.61 | 0.00 | 0.01 | 0.09 | 0.00 |

The surface of "as-received" chrysotile had the Mg and O atoms as the most dominant elements, revealing the external $Mg(OH)_2$ layers, and the Si atom as a secondary element. Although some C contaminants were present at the outermost surface side, the atomic ratio of Mg/Si was 1.82. After dipping the chrysotile fiber disks in 1.5 M $H_3PO_4$, their surfaces exhibited a considerably higher Mg/Si ratio, compared with that of the untreated samples. This high ratio may be related to the migration of P and O atoms from the reagent to the fiber's surfaces, reflecting their coverage with a thick $MgHPO_4 \cdot 7H_2O$ layers, as a reaction product. When the surface of chrysotile was treated with 1.5 M HF, more F and O atoms were incorporated into 10. the surfaces of the fiber. The Mg/Si ratio was similar to that of the untreated chrysotile. In contrast, the lowest Mg/Si ratio was obtained from the surfaces of chrysotile fibers treated with 1.5 M FP(O)(OH)$_2$, suggesting that the top surface layers were occupied by an increased amount of Si-related reaction products and by-products.

With regard to the amosite fibers, the chemical composition of its surfaces consisted of three dominant elements, Si, C, and O. Mg, Fe, and Mn atoms were found as minor elements, in the Mg/Si, Fe/Si, and Mn/Si ratios of 0.06, 0.19, and 0.01, respectively. The source of Si and O atoms came from the outer silicious layers of amosite structure, while C was generated by organic carbonaceous impurities, such as amino-acids and hydrocarbons. These minor elements might be associated with the intermediate oxygen-coordinated cation species present beneath the $SiO_4$ tetrahedral layers. Treating amosite with 1.5 M $H_3PO_4$ resulted in the migration of 3.81% P atoms from the solution to the surfaces of the fiber. By comparison with that of untreated amosite, the quantities of all the elements, excepting the O atom, slightly decreased because of the coverage of P and O atom-related chemical compounds over the surfaces of the amosite fiber.

The identification of these compounds was later carried out by inspecting the high-resolution $P_{1s}$ core-level spectrum. However, the atomic ratios of Mg/Si, Fe/Si, and Mn/Si were almost the same as those of untreated amosite surfaces, indicating that there were no major changes in surface elemental components of $H_3PO_4$-treated amosite. In other words, the surfaces of amosite have a low reactivity with $H_3PO_4$. With 1.5 M HF, the decrease in the Mg/Si and Fe/Si ratios indicated that more Si atoms occupied the superficial layers of amosite fiber as shown in Table 2.

The incorporation of 8.65% F atoms and an additional O atom into the surface layers indicated that the reaction at interfaces between HF and amosite could precipitate SiF-containing compounds and $SiO_2$. The surfaces of 1.5 M $FP(O)(OH)_2$-treated amosite exhibited the lowest amount of the cation species, especially of Mn atom; namely, there was a further decrease in the Mg/Si, Fe/Si, and Mn/Si ratios, while additional O, P, and F atoms migrated from the $FP(O)(OH)_2$ solution to the surfaces of the amosite fiber. Thus, $FP(O)(OH)_2$ had a strong affinity for the amosite surfaces evidenced by extensive deposits of Si-related conversion products.

To identify the conversion products formed at the interface between asbestos and $FP(O)(OH)_2$, HF, and $H_3PO_4$ solutions, and also to understand better the chemical states of the surface, we inspected the high-resolution $Mg_{2p}$, $Si_{2p}$, $P_{2p}$, $F_{1s}$, $Fe_{2p3/2}$, and $Mn_{2p3/2}$ core-level spectra for chrysotile and amosite disks treated with $FP(O)(OH)_2$, HF, and $H_3PO_4$ solutions at 1.5 M. For all the XPS core-level spectra, the scale of the binding energy (BE) was calibrated with the $C_{1s}$ of the principal hydrocarbon-type carbon peak fixed at 285.0 eV as an internal reference standard. A curve-deconvolution technique using a Du Pont curve resolver was employed to substantiate the information on the respective chemical states from the high-resolution spectrum of each element.

Figure 10:
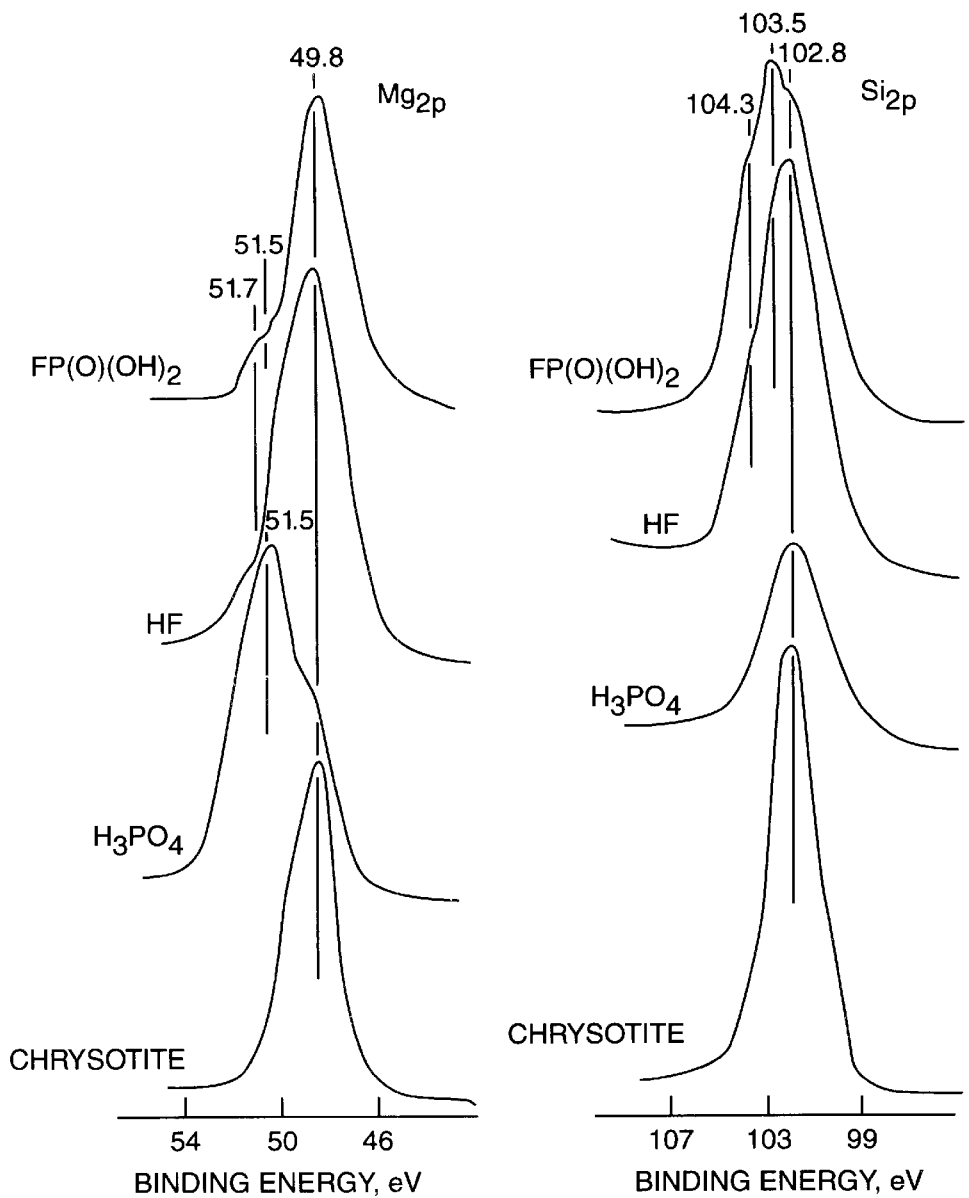
FIG. 10 illustrates XPS $Mg_{2p}$ and $Si_{2p}$ core-level spectra for surfaces of chrysotile fiber untreated, and treated with 1.5 M $H_3PO_4$, 1.5 M HF, and 1.5 M $FP(O)(OH)_2$.

FIG. 10 illustrates $Mg_{2p}$ and $Si_{2p}$ core-level spectra chemically treated fiber surfaces of chrysotile. The $Mg_{2p}$ region of chrysotile revealed only a single symmetric peak at 49.8 eV, belonging to Mg in chrysotile, $Mg_3(Si_2O_5)(OH)_4$. In contrast, a striking change in the feature of the $Mg_{2p}$ signal was observed from the $H_3PO_4$-treated samples; in particular, a new principal signal had emerged at the BE position of 51.5 eV which could have originated from Mg in the magnesium orthophosphate compounds, while the signal at 49.8 eV, corresponding to the Mg in chrysotile had became the shoulder peak, reflecting minor changes in the chemical state. Relating this finding to the FT-IR and XRD results, the orthophosphate compound reflected the formation of $MgHPO_4.7H_2O$ as a reaction product. Without being bound by theory, it is believed that $MgHPO_4.7H_2O$ precipitated on chrysotile was the reason why such a high Mg/Si ratio together with a certain amount of P were obtained from the chrysotile sample surfaces treated with $H_3PO_4$.

The $Mg_{2p}$ spectrum of HF-treated samples displayed a feature which could be resolved into two Gaussian components: at 49.8 eV as the major peak and at 51.7 eV as the minor one. The latter peak could be assignable to Mg in $MgF_2$, and the former peak was due to Mg in chrysotile. As expected, the $Mg_{2p}$ region of $FP(O)(OH)_2$ samples included the two reaction products, $MgHPO_4.7H_2O$ and $MgF_2$, corresponding to the peaks at 51.7 and 51.5 eV, and the unreacted chrysotile at 49.8 eV as the main component. The $Si_{2p}$ spectra provided additional information on interfacial reaction products. For the surfaces of $H_3PO_4$ samples, the spectral feature of the $Si_{2p}$ region closely resembled that of the untreated chrysotile which had only a single peak at 102.8 eV, revealing Si in the chrysotile. Thus, there were no reaction products related to the $SiO_2$—$P_2O_5$ systems.

When the chrysotile sample was treated with HF, two additional shoulder peaks at 103.5 and 104.3 eV evolved in the spectrum containing a major peak at 102.8 eV. Based on published data, the peaks at 103.5 and 104.3 eV could be assigned to the Si in $SiO_2$ gel and in fluorosilicic acid ($H_2SiF_6$), respectively. Because $H_2SiF_6$ is soluble in water, it could not be identified in FT-IR and XRD studies which were conducted on samples washed with deionized water. By comparison with a sample of HF treated chrysotile, the major characteristic of spectral feature for the $FP(O)(OH)_2$-treated samples was that the $SiO_2$ gel-related shoulder peak at 103.5 eV became the principal one, reflecting a heavy coverage of $SiO_2$ gel over the chrysotile surfaces.

Figure 11:
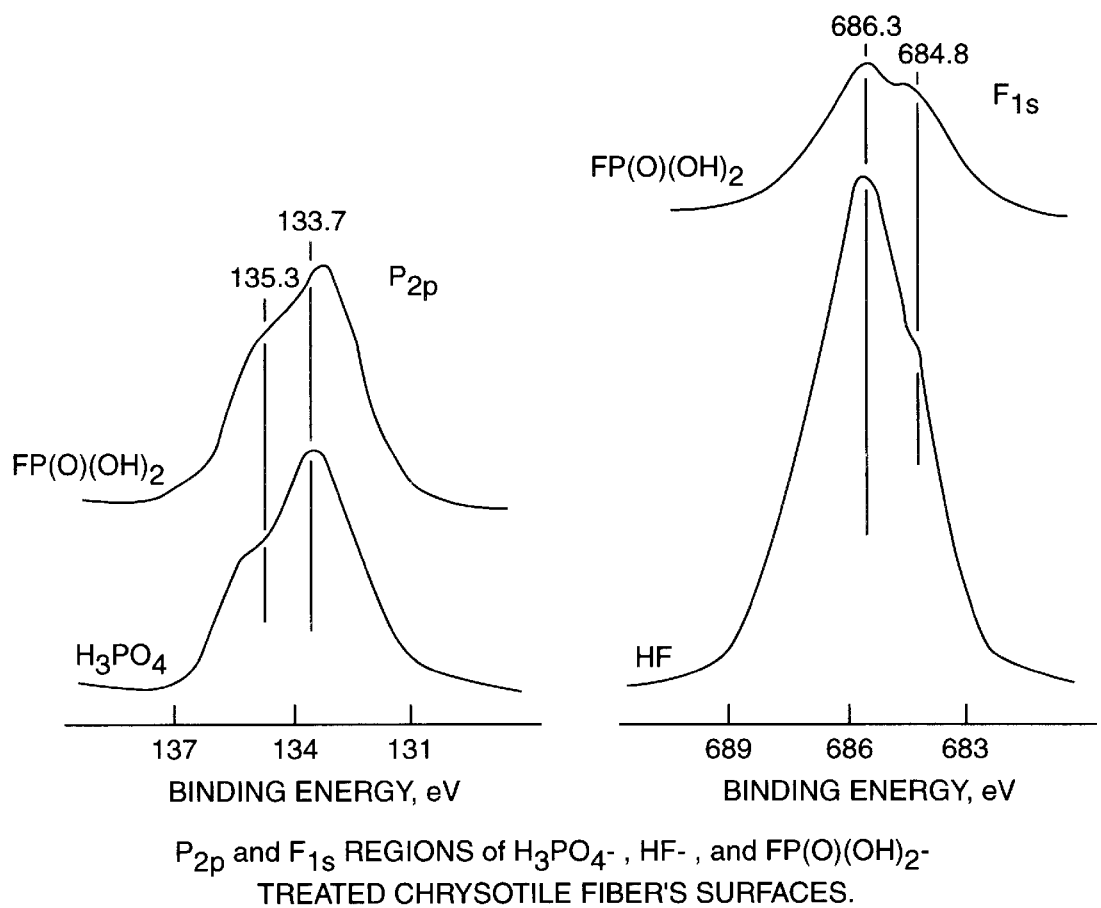
FIG. 11 shows XPS $P_{2p}$ and $F_{1s}$ regions for surfaces of chrysotile fiber treated with 1.5 M $H_3PO_4$, 1.5 M HF and 1.5 M $FP(O)(OH)_2$.

The presence of these reaction products and by-products identified in $Mg_{2p}$ and $Si_{2p}$ regions were supported by inspecting the $P_{2p}$ and $F_{1s}$ spectra of chrysotile surfaces treated with 1.5 M $H3PO_4$, HF, and $FP(O)(OH)_2$. As shown in FIG. 9, in the $P_{2p}$ region, a similar feature in the curves could be seen in the both the $H_3PO_4$- and $FP(O)(OH)_2$-treated surfaces of chrysotile fiber; they had two resolvable peaks, at 133.7 eV, originating from the P in $MgHPO_4.7H_2O$ as the major orthophosphate-related reaction product, and at 135.3 eV, which corresponded to the P in phosphorous pentoxide, $P_2O_5$. In the $F_{1s}$ region of $FP(O)(OH)_2$ and HF samples, as shown in FIG. 11, two F-related reaction products, $H_2SiF_6$ and $MgF_2$, were identical as indicated by the emergence of two peaks, at 686.3 eV as the main component, and at 684.8 eV as the minor one. From the XPS study described above, the two-step reaction route, acid-base and fluorinating reactions at interfaces between $FP(O)(OH)_2$ solution and chrysotile fibers could account for the precipitation of four possible conversion products, $SiO_2$ gel, $H_2SiF_6$, $MgHPO_4.7H_2O$, and $MgF_2$, all environmentally benign non-regulated components.

Figure 12:
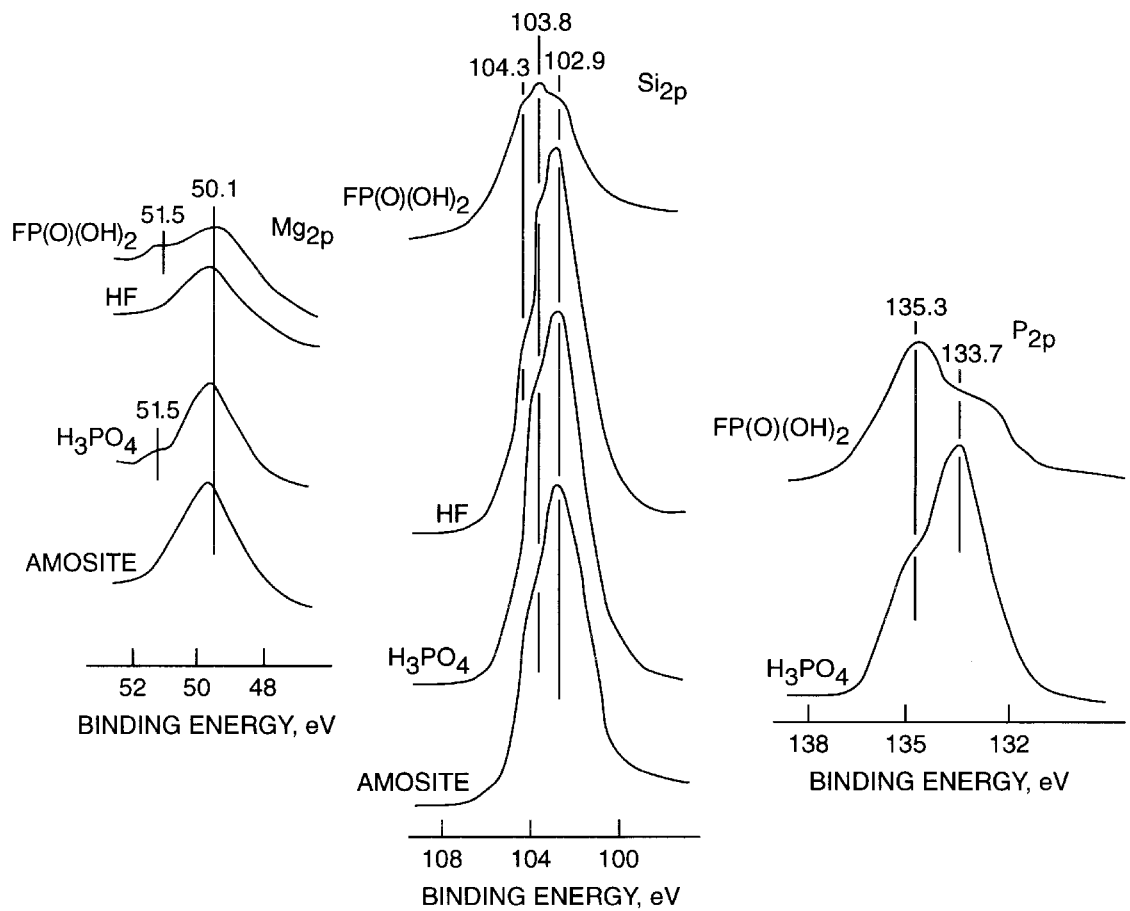
FIG. 12 illustrates XPS spectra of $Mg_{2p}$, $Si_{2p}$, and $P_{2p}$ regions for surfaces of amosite fiber untreated, and treated with 1.5 M $H_3PO_4$, 1.5 M HF, and 1.5 M $FP(O)(OH)_2$.

Next, the contributors to the peaks emerging in the $Mg_{2p}$, $Si_{2p}$, $P_{2p}$, $F_{1s}$, $Fe_{2p3/2}$, and $Mn_{2p3/2}$ regions were investigated with respect to amosite fibers treated with 1.5 M $FP(O)(OH)_2$, HF, and $H_3PO_4$. The resulting spectra in the $Mg_{2p}$, $Si_{2p}$, and $P_{2p}$ regions are illustrated in FIG. 12. In the $Mg_{2p}$ region, although the signal intensity of the overall spectrum is weak, the untreated amosite exhibited a single peak at 50.1 eV, indicating the presence of Mg of the $Mg^{2+}$—O bond in the intermediate cation layers. Treating amosite with $H_3PO_4$ caused the development of an additional shoulder peak at 51.5 eV. In the $Mg_{2p}$ spectrum of $H_3PO_4$-treated chrysotile, the contributor to the peak at 51.5 eV was assigned to the Mg in dibasic orthophosphate derivatives. Thus, it was inferred that a possible acid-base reaction between $H_3PO_4$ and oxygen-coordinated $Mg^{2+}$ also precipitates $MgHPO_4$ compounds. The spectral features of HF-treated amosite closely resembled that of untreated amosite, suggesting that there is no precipitation of the magnesium fluoride-related reaction products. Although the signal intensity of overall spectrum was very weak, the $FP(O)(OH)_2$ sample surfaces had two signals at 50.1 and 51.5 eV, revealing oxygen-coordinated $Mg^{2+}$ as the major component, and the $MgHPO_4$ reaction products as a secondary component.

In the $Si_{2p}$ region, the spectrum of amosite fibers demonstrated two Si-related components. The major component of silica in silicious layers was reflected in the principal line at 102.9 eV, while Si in quartz was present as a minor component at 103.8 eV. A similar spectral curve was obtained from the $H_3PO_4$-treated amosite surfaces, supporting the fact that the $SiO_4$ tetrahedra of amosite surfaces were unreactive to $H_3PO_4$. An addition signal as a weak shoulder peak at 104.3 eV was incorporated into this spectrum when the amosite was treated with HF. This weak signal was attributable to the Si in $H_2SiF_6$. Also, this spectrum showed the growth of quartz-related signal at 103.8 eV, indicating that the interaction between HF and amosite contributes to forming quartz-enriched top surface layers. The spectral features of $FP(O)(OH)_2$-treated samples differed from those of other spectra of amosite. A different feature was that quartz- and $H_2SiF_6$-related peaks at 103.8 and 104.3 eV became the major and secondary signals, respectively, while the intensity of the amosite Si peak at 102.9 eV had considerably decayed. Thus, $FP(O)(OH)_2$ had a strong affinity for the $SiO_4$ tetrahedral layers in amosite, to form quartz as the major reaction by-product, and $H_2SiF_6$ as the secondary reaction product.

Figure 13:
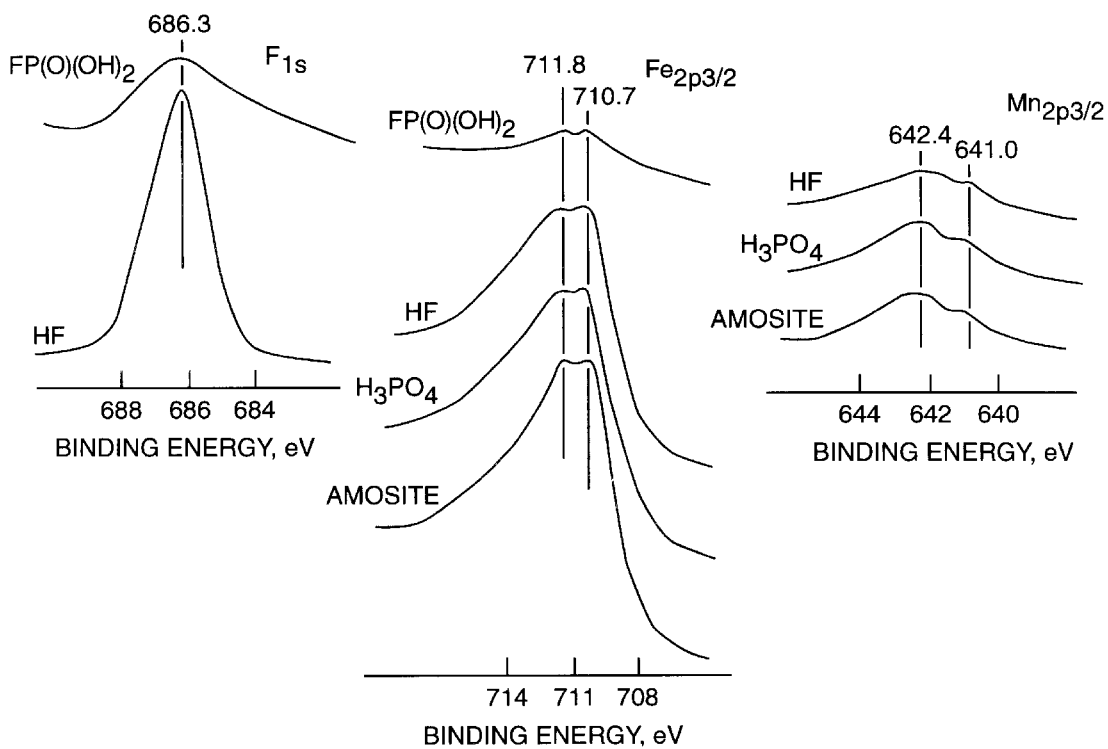
FIG. 13 shows XPS $F_{1s}$, $Fe_{2p3/2}$ and $Mn_{2p3/2}$ core-level spectra for surfaces of amosite untreated, and treated with 1.5 M $H_3PO_4$, 1.5 M HF, and 1.5 M $FP(O)(OH)_2$.

In the $P_{2p}$ region, the spectra for the $FP(O)(OH)_2$- and $H_3PO_4$-treated samples could be accounted for the precipitation of two P-related compounds, $MgHPO_4$ at 133.7 eV and $P_2O_5$ at 135.3 eV. $H_3PO_4$ treatment favorably formed $MgHPO_4$ compounds, as shown by the prominent peak at 133.7 eV. This information was supported by inspecting the spectra excited in the $F_{1s}$, $Fe_{2p3/2}$, and $Mn_{2p3/2}$ regions as shown in FIG. 13. Regardless of the fact that the signal intensity of the overall spectrum depended on the particular chemical reagent, only one signal at 686.3 eV, corresponding to $H_2SiF_6$, was apparent in the $F_{1s}$ region of the $FP(O)(OH)_2$ and HF samples. In the $Fe_{2p3/2}$ region, all the untreated and treated amosite samples showed a spectra containing two distinct peaks separated by 1.1 eV. These peaks originated from the Fe in the oxygen-coordinated Fe ion species in the cation layers. The spectra of untreated, and HF- and $H_3PO_4$-treated amosite samples exhibited two peaks at 642.4 and at 641.0 eV; the former peak as main component was assigned to Mn of oxygen-coordinated Mn ions present in cation layers, and the latter was assigned to Mn in MnO. Based on this assignment, amosite contained a certain amount of $MnO_2$. No Fe and Mn-related reaction products were found.

Accordingly, the reasons for the significantly pronounced leaching of Mg, Fe, and Mn ionic species by FP(O)(OH) was interpreted as follows. In the first reaction step, the fluorinating activity of F ions from $FP(O)(OH)_2$ present on the surface silicious layers contributed to disintegrating the $SiO_4$ tetrahedra structure. Once the outer layer had broken, $FP(O)(OH)_2$-induced acids readily diffused into the intermediate cation layers, and then reacted with the oxygen-coordinated Mg, Fe, and Mn ionic species to break Mg—O, Mg—O, and Mg—O bonds. Such bond breakages by acid-base reactions not only brought about the hydrolysis of the $R^{2+}O_6$ and $R^{3+}O_6$ octahedral structure, but also afforded the precipitation of $MgHPO_4$ reaction products.

D. Discussion of Experimental Results

By comparing the enthalpy values, ΔH (cal./g), evolved by exothermic reactions between the chemical reagents and chrysotile fibers, the extent of reactivity of the reagents to chrysotile asbestos was in the order: $FP(O)(OH)_2$>$FSO_3H$>$HF$>>$H_2SiF_6$>$HBF_4$>>$H_3PO_4$>$H_2SO_4$, thereby indicating that $FP(O)(OH)_2$ was the most efficient reagent which achieved a satisfying decomposition of chrysotile for reaction times up to 30 minutes. When two different asbestos, chrysotile with a serpentine structure and amosite with an amphibole structure, came in contact with 1.5 M $FP(O)(OH)_2$ solution, the ΔH generated from conversion of chrysotile was much higher than that from conversion of amosite. Hence, the amphibole structure had less susceptibility to reaction with $FP(O)(OH)_2$, than the serpentine structure of chrysotile. Increasing the concentration of $FP(O)(OH)_2$ to 2.0 M generated a considerably high ΔH, and also served to leach a large amount of ionic species, reflecting the complete conversion of both chrysotile and amosite fibers into non-regulated environmentally benign materials.

Based on the equilibrium relation of $FP(O)(OH)_2$ in aqueous medium, represented as $FP(O)(OH)_2+H_2O=HF+H_3PO_4$, reaction mechanisms and decomposition pathways of chrysotile fibers by $FP(O)(OH)_2$ according to the present invention are shown in FIG. 1 above. In the first stage of decomposition, the acid-base reaction between $H_3PO_4$ derived from $FP(O)(OH)_2$ and external $Mg(OH)_2$ layers of chrysotile precipitated crystalline $MgHPO_4.7H_2O$ as a reaction product, and also lixiviated Mg ions from the chrysotile, thereby removing the $Mg(OH)_2$ layers. The fluorinating activity of HF from $FP(O)(OH)_2$ on the inner silicious layers and lixiviated Mg ions, in the second stage of decomposition, served to precipitate three conversion products, $MgF_2$, $H_2SiF_6$, and $SiO_2$ gel. Further, attack of extra HF on $SiO_2$ gel caused its dissolution. Nevertheless, we believe that the two-step reaction route, acid-base and fluorinating reactions, contributed significantly to promote the conversion of chrysotile fibers into non-regulated materials. In contrast, tetrahedral chains that sandwich a layer of edge-shared $R^{2+}O_6$ and $R^{3+}O_6$ octahedra were quite different from that of chrysotile because of the presence of silicate oxygen-enriched surfaces which had a low susceptibility to reaction with acid. Thus, the silicate tetrahedra as top surface layers preferentially reacted with HF, rather than that with $H_3PO_4$ as shown in FIG. 2 above. This fluorinating reaction triggered the formation of quartz and $H_2SiF_6$ as conversion products. The quartz was finally dissolved by further attack of HF, thereby resulting in leaching of a large amount of silicate anions. Once the silicious layers were eliminated, the $H_3PO_4$ solution readily diffused into the $R^{2+}O_6$ and $R^{3+}O_6$ octahedra as the intermediate cation layers to react with oxygen-coordinated Mg, Fe, and Mn ionic species. Such an acid-base reaction not only led to the breakage of $R^{2+}$- and $R^{3+}$—O bonds, thereby lixiviating the ionic species, such as Mg, Fe, and Mn, but also precipitated $MgHPO_4$ as a reaction product.

Example 5

In this example chrysotile containing fireproofing was converted to environmentally benign components by treatment with $FP(O)(OH)_2$(FPA).

Two fire-proofing samples of 12"×12"×2" each made by W.R. Grace & Co. and having 12.7% chrysotile and the remainder gypsum and vermiculite were separately sprayed with solutions of 0.5M FPA and 2.0M FPA solutions, respectively. After spraying, the FAP-saturated fire-proofings were left for 7 days at room temperature, and then dried for 10 hours in an oven at 40° C. The dried samples were analyzed to determine the extent of conversion of chrysotile fibers into the non-regulated environmentally benign materials by FT-IR as shown in FIG. 14.

Figure 14:
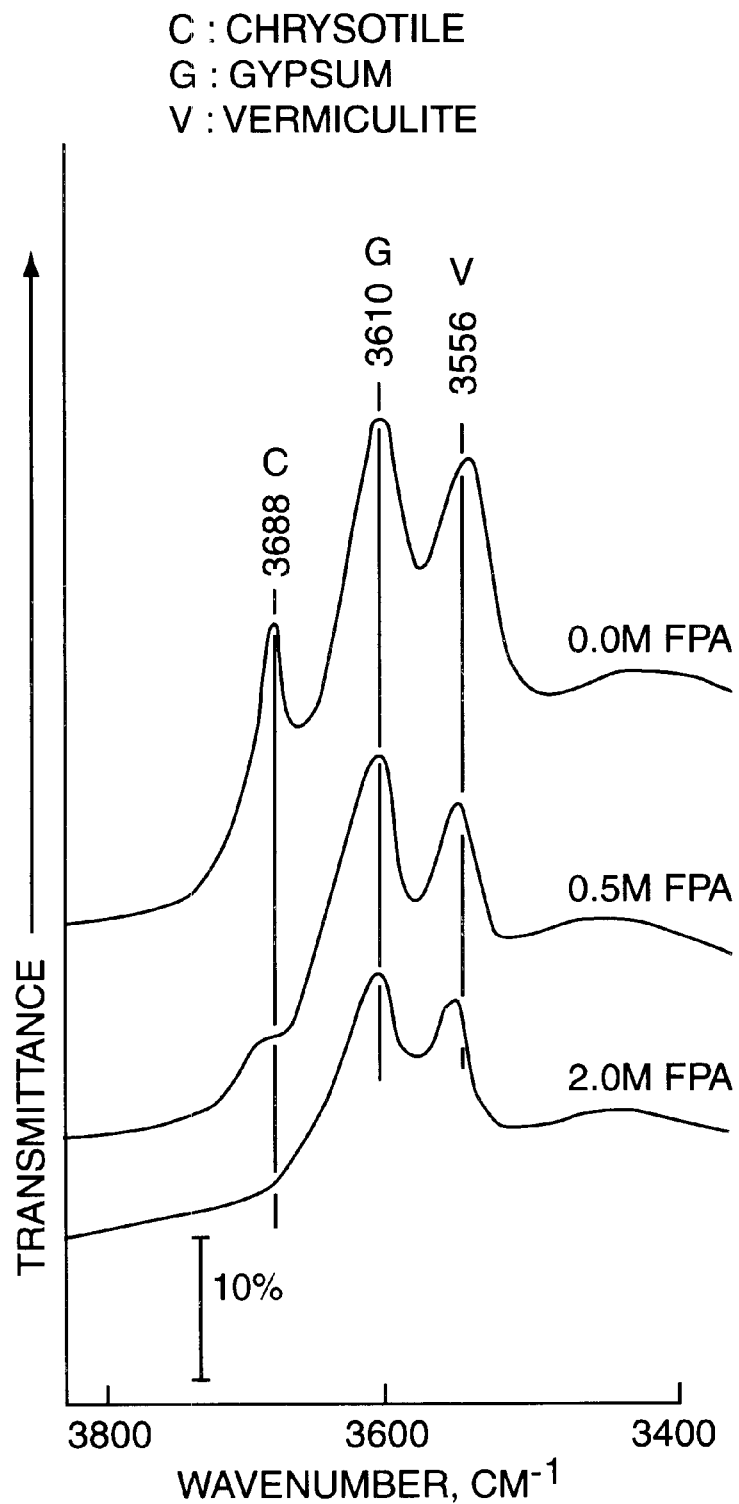
FIG. 14 illustrates FT-IR spectra of chrysotile fibers untreated, and treated with 0.5 M FPA and 2.0 M FPA.

As a result of treatment with FPA, a comparison of FT-IR spectra shown in FIG. 14 illustrates how the sharp peak of chrysotile from an untreated sample of fire-proofing changed to a shoulder in a sample treated with 0.5M FPA. Increasing the concentration of FPA to 2.0 M led to the disappearance of chrysotile-related peak entirely, while the gypsum- and vermiculite-related IR peaks still remain. The FT-IR data illustrated that when fire-proofing samples are treated with FPA solutions, FPA preferentially reacted chrysotile, rather than the gypsum and vermiculite. Such a reaction led to eliminating almost all the chrysotile from the fire-proofing.

Example 6

In this example samples of pure amosite or chrysotile were treated with solutions of $HPF_6$. Samples of 0.5 grams of pure amosite or pure chrysotile were separately immersed for 7 days in 10 g solutions of 0.5M $HPF_6$, 1.0M $HPF_6$ and 2.0M $HPF_6$. Each pure sample was completely dissolved when treated with more concentrated $HPF_6$, namely 1.0M $HPF_6$ and 2.0M $HPF_6$. In fact, when more concentrated $HPF_6$ was used to treat pure amosite or chrysotile samples no visual evidence of any asbestos was observed.

Example 7

In this example, rigid thermal system insulation (TSI) containing 49 percent amosite and 51 percent mineral fillers and binders was converted by treatment with an aqueous solution of 0.6M FPA. The TSI was removed from an old power plant at Brookhaven National laboratory. A 3.6 gram sample of the TSI was treated with the 0.5M FPA solution for 1 day at room temperature, and then oven dried for 6 days at about 40° C. The dried specimen was then analyzed by XRD in order to determine the amount of amosite remaining in the TSI. The XRD analysis indicated that the amosite contact had been reduced approximately 92% to a level of 4 percent.

Examples 8–11

Examples 8 to 11 were treated using a procedure similar to that described in Example 7 above, with the exception that the TSI samples were treated with various combinations and concentrations of the $HPF_6/H_3PO_4$ system. Three to five gram samples of the TSI were treated at room temperature conditions for 14 days with the chemical systems shown in Table 3. The treated samples were then oven dried for a minimum of 24 hours at about 130° C. XRD analysis of the dried samples indicated that each of the combinations of $HPF_6/H_3PO_4$ tested reduced the amosite content of the TSI samples approximately 37 percent. $Hf_{vap}$ concentrations within the headspace of the storage containers for the $HPF_6/H_3PO_4$ system were measured after 14 days and found to be <0.5 ppm.

TABLE 3

XRD results of TSI samples treated with the $FP(O)OH)_2$, $HPF_6/H_3PO_4$, systems and storage container headspace measurements for $HF_{vap}$.

| Example | Chemical Conversion System | Soak Time | Amosite Content (by XRD analysis) | $HFP_{vap}$ Headspace Concentration |
|---|---|---|---|---|
| 8 | Untreated thermal system insulation | — | 35 to 60% | — |
| 9 | 18% 1.0M $HPF_6$/ 1.0M$H_3PO_4$ 82% water | 14 days | 32% | No reading taken |
| 10 | 18% 1.5M $HPF_6$/ 1.0M$H_3PO_4$ 82% water | 14 days | 30% | <0.5 ppm (14 days) |
| 11 | 18% 2.0M $HPF_6$/ 1.0M$H_3PO_4$ 82% water | 14 days | 31% | None (14 days) |

Examples 12–22

A full-size door containing thermal insulation was removed, intact, from a building in Danville, Va. by W.R. Grace & Co. and provided to Brookhaven National laboratory for testing. The rigid thermal insulation within the door contained 30 percent amosite and 15 percent chrysotile with the remainder being filler and binder material. Three to five gram samples of the insulation were removed from the door and treated for periods up to 14 days in length with various concentrations of $HPF_6/H_3PO_4$ as shown in Table 4. The samples were then oven dried at 40° C. and then analyzed by XRD. Depending upon the strength of the chemical system and the length of the treatment time, the XRD analysis showed that the amosite and chrysotile content of the insulation was reduced up to 68 and 93 percent, respectively. In Examples 18 through 22 the chrysotile content of the insulation was reduced to a level below the regulatory limit of 1 percent. Concentrations of $H_{vap}$ within the headspace of the chemical system storage containers were, with the exception of Example 22, measured at the times indicated in Table 4 and found to be below the ceiling limit of 3 ppm as set forth by American Conference of Governmental Industrial Hygienists.

TABLE 4

XRD results of fire door insulation samples treated with the $HPF_6/H_3PO_4$ systems and storage container headspace measurements for $H_{vap}$.

| Example | Chemical Conversion System | Treatment Time | Asbestos Content (by XRD analysis) Amosite | Chrysotile | Headspace Concentration $HF_{vap}$ |
|---|---|---|---|---|---|
| 12 | Untreated fire door insulation | — | 30% | 15% | — |
| 13 | 18% 0.5M$HPF_6$/ 1.0M$H_3PO_4$ 82% water | 7 days | 20% | 3% | None (4 days) |
| 14 | 18% 1.0M$HPF_6$/ 1.0M$H_3PO_4$ 82% water | 3 days | 14% | 3% | None (4 days) |
| 15 | 18% 1.0M$HPF_6$/ 1.0M$H_3PO_4$ 82% water | 14 days | 25% | 2.5% | No reading taken |
| 16 | 18% 1.5M$HPF_6$/ 1.0M$H_3PO_4$ 82% water | 14 days | 17% | 3.5% | <0.5 ppm (14 days) |
| 17 | 18% 2.0M$HPF_6$/ 1.0M$H_3PO_4$ 82% water | 14 days | 22% | 1.4% | None (14 days) |
| 18 | 24% 1.0M$HPF_6$/ 1.0M$H_3PO_4$ 76% water | 4 days | 20% | <1% | <0.5 ppm (4 days) |
| 19 | 30% 1.0M$HPF_6$/ 1.0M$H_3PO_4$ 70% water | 4 days | 17% | <1% | 1 ppm (4 days) |
| 20 | 36% 1.0M$HPF_6$/ 1.0M$H_3PO_4$ 64% water | 4 days | 12.3% | <1% | 1 to 1.5 ppm (4 days) |
| 21 | 54% 1.5M$HPF_6$/ 1.0M$H_3PO_4$ 46% water | 4 days | 14% | <1% | 2 to 2.5 ppm (4 days) |
| 22 | 72% 1.5M$HPF_6$/ | 4 days | 9.5% | <1% | >5 ppm |

We claim:

1. A composition for converting asbestos-containing material to an environmentally benign component which comprises a fluoro acid decomposing agent capable of dissociating said asbestos-containing material to non-regulated, environmentally benign component, wherein said asbestos-containing material is a mixture of chrysotile and amosite asbestos-containing material, and said fluoro acid decomposing agent is an inorganic acid selected from the group consisting of $FP(O)(OH)_2$, hexafluorophosphoric acid, a mixture of hydrofluoric and phosphoric acid and a mixture of hexafluorophosphoric acid and phosphoric acid.

2. The composition of claim 1, wherein said asbestos-containing material is amosite-containing thermal insulation or chrysotile-containing fire-proofing material.

3. The composition of claim 2, wherein said fluoro acid decomposing agent is from about 1.5M $FP(O)(OH)_2$ to about 2.0M $FP(O)(OH)_2$.

4. The composition of claim 2, wherein said fluoro acid decomposing agent is 2.0M $FP(O)(OH)_2$.

5. The composition of claim 1, wherein said said non-regulated, environmentally benign component includes silica gel and quartz.

6. A method for converting asbestos-containing material including a mixture of chrysotile and amosite asbestos-containing material to an environmentally benign, non-regulated component comprising decomposing said asbestos-containing material to said non-regulated component by applying to said asbestos-containing material an effective amount of a fluoro acid decomposing agent, wherein said fluoro acid decomposing agent is an inorganic acid selected from the grouo consisting of $FP(O)(OH)_2$, hexafluorophosphoric acid a mixture of hydrofluoric and phosphoric acid and a mixture of hexafluorophosphoric acid and phosphoric acid.

7. The method of claim 6, wherein said asbestos-containing material is amosite-containing thermal insulation or chrysotile-containing fire-proofing material.

8. The method of claim 6, wherein said fluoro acid decomposing agent is from about 1.5M $FP(O)(OH)_2$ to about 2.0 M $FP(O)(OH)_2$.

9. The method of claim 7, wherein said fluoro acid decomposing agent is 2.0M $FP(O)(OH)_2$.

10. The method of claim 6, wherein said fluoro acid decomposing agent is applied by spraying or immersion of said asbestos-containing material.

11. The method of claim 6, wherein said non-regulated, environmentally benign component includes silica gel and quartz.

12. A composition for converting amosite asbestos-containing material to an environmentally benign component which comprises a fluoro acid decomposing agent capable of dissociating said amosite asbestos-containing material to a non-regulated, environmentally benign component, wherein said fluoro acid decomposing agent is an inorganic acid selected from the group consisting of $FP(O)(OH)_2$, hexafluorophosphoric acid, a mixture of hydrofluoric and phosphoric acid and a mixture of hexafluorophosphoric acid and phosphoric acid.

13. A method for converting amosite asbestos-containing material including amosite asbestos-containing material to an environmentally benign, non-regulated component comprising decomposing said asbestos-containing material to said non-regulated component by applying to said asbestos-containing material an effective amount of a fluoro acid decomposing agent, wherein said fluoro acid decomposing agent is an inorganic acid selected from the group consisting of $FP(O)(OH)_2$, hexafluorophosphoric acid, a mixture of hydrofluoric and phosphoric acid and a mixture of hexafluorophosphoric acid and phosphoric acid.

14. The composition of claim 12, wherein said non-regulated, environmentally benign component includes quartz.

15. The method of claim 13, wherein said non-regulated, environmentally benign component includes quartz.

\* \* \* \* \*